US009236197B2

(12) United States Patent
Dai et al.

(10) Patent No.: US 9,236,197 B2
(45) Date of Patent: Jan. 12, 2016

(54) GRAPHENE HYBRID MATERIALS, APPARATUSES, SYSTEMS AND METHODS

(75) Inventors: Hongjie Dai, Cupertino, CA (US); Hailiang Wang, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 829 days.

(21) Appl. No.: 13/401,655

(22) Filed: Feb. 21, 2012

(65) Prior Publication Data

US 2012/0214068 A1   Aug. 23, 2012

(51) Int. Cl.
*H01M 4/02* (2006.01)
*H01G 11/36* (2013.01)
*B82Y 30/00* (2011.01)
*B82Y 40/00* (2011.01)
*H01M 4/131* (2010.01)
*H01M 4/136* (2010.01)
*H01M 4/62* (2006.01)
*H01M 4/36* (2006.01)
*H01M 4/04* (2006.01)
*H01M 4/58* (2010.01)

(52) U.S. Cl.
CPC .............. *H01G 11/36* (2013.01); *B82Y 30/00* (2013.01); *B82Y 40/00* (2013.01); *H01M 4/131* (2013.01); *H01M 4/136* (2013.01); *H01M 4/625* (2013.01); *H01M 4/0471* (2013.01); *H01M 4/366* (2013.01); *H01M 4/5825* (2013.01); *Y02E 60/122* (2013.01); *Y02E 60/13* (2013.01); *Y02P 70/54* (2015.11); *Y10T 428/261* (2015.01)

(58) Field of Classification Search
CPC .... H01M 4/0471; H01M 4/131; H01M 4/366
USPC .............................................. 429/224
See application file for complete search history.

(56) References Cited

PUBLICATIONS

Nagarajan et al. Cathodic electrodeposition of MnOx films for electrochemical supercapacitors. Electrochim. Acta, vol. 51, 2006, pp. 3039-3045 [online], [retrieved on Mar. 4, 2015]. Retrieved from the Internet <URL: http://www.sciencedirect.com/science/article/pii/S0013468605010303>.*
Jang et al. Supercapacitor Performance of Hydrious Ruthenium Oxide Electrodes Prepared by Electrophoretic Deposition. J. Electrochem. Soc. vol. 153, 2006, pp. A321-A328 [online], [retrieved on Mar. 4, 2015]. Retrieved from the Internet <URL: http://jes.ecsdl.org/content/153/2/A321.short>.*
Wang et al. LiMn1-xFexPO4 Nanorods Grown on Graphene Sheets for Ultrahigh-Rate-Performance Lithium Ion Batteries. Angew. Chem. Int. Ed., vol. 50, 2011, pp. 1-6 [online], [retrieved on Mar. 4, 2015]. Retrieved from the Internet <URL: https://web.stanford.edu/group/cui_group/papers/114%20Yuan%20LiMnFePO4%20nanorod.PDF>.*

(Continued)

*Primary Examiner* — Basia Ridley
*Assistant Examiner* — James Erwin
(74) *Attorney, Agent, or Firm* — Crawford Mauna PLLC

(57) ABSTRACT

Graphene based materials are provided in connection with various devices and methods of manufacturing. As consistent with one or more embodiments, an apparatus includes a graphene sheet and a single-crystal structure grown on the graphene sheet, with the graphene sheet and single-crystalline structure functioning as an electrode terminal. In various embodiments, the single-crystalline structure is grown on a graphene sheet, such as by using precursor particles to form nanoparticles at the distributed locations, and diffusing and recrystallizing the nanoparticles to form the single-crystal structure.

25 Claims, 18 Drawing Sheets

(56) References Cited

PUBLICATIONS

Goncalves et al. Surface Modification of Graphene Nanosheets with Gold Nanoparticles: The Role of Oxygen Moieties at Graphene Surface on Gold Nucleation and Growth. Chem. Mater., vol. 21, 2009, pp. 4796-4802 [online], [retrieved on Aug. 19, 2015]. Retrieved from the Internet <URL: http://pubs.acs.org/doi/abs/10.1021/cm901052s>.*

Wang, H.; Liang,Y.; Mirfakhrai,T.; Chen, Z.; Sanchez Casalongue, H. and Dai, H., "Advanced Asymmetrical Supercapacitors Based on Graphene Hybrid Materials." Nano Res. DOI: 10.1007/s12274-011-0129-6.

Liu, N.; Hu, L.; McDowell, M. T.; Jackson, A. and Cui, Y., "Prelithiated Silicon Nanowires as an Anode for Lithium Ion Batteries." ACS, NANO.

Padhi, A. K.; Nanjundaswamy, K. S. and Goodenough, J. B., "Phospho-olivines as Positive-Electrode Materials for Rechargeable Lithium Batteries." J. Electrochem. Soc. 144, pp. 1188-1194, 1997.

Kotz, R. and Carlen, M., "Principles and Applications of Electrochemical Capacitors." Electrochimica Acta, 45, pp. 2483-2498, 1999.

Whittingham, M. S., "Lithium Batteries and Cathode Materials." Chem. Rev. 104, pp. 4271-4301, 2004.

Winter, M. and Brodd, R. J., "What Are Batteries, Fuel Cells and Supercapacitors?" Chem. ReV. 104, pp. 4245-4269, 2004.

Novoselov, K.S.; Geim, A. K.; Morozov, S. V.; Jiang, D.; Zhang, Y.; Dubonos, V.; Grigorieva, I. V. and Firsov, A. A., "Electric Field Effect in Atomically Thin Carbon Films." Science 306, pp. 666-669, 2004.

Wang, Y.; Wang, Z. and Xia, Y., "An asymmetric supercapacitor using $RuO_2/TiO_2$ nanotube composite and activated carbon electrodes." Electrochim. Acta, 50, pp. 5641-5646, 2005.

Yin, Y. and Alivisatos, A. P., "Nanoscale Materials." Nature 437, pp. 664-670, 2005.

Li, X.; Wang, X.; Zhang, L.; Lee, S. and Dai, H., "Chemically Derived, Ultrasmooth Graphene Nanoribbon Semiconductors." Science, 319, pp. 1229-1232, 2008 .

Simon, P. and Gogotsi, Y., "Materials for Electrochemical Capacitors." Nat. Mater., 7, pp. 845-854, 2008.

Bruce, P. G.; Scrosati, B. and Tarascon, J., "Nanomaterials for Rechargeable Lithium Batteries." Angew. Chem. Int. Ed. 47, pp. 2930-2946, 2008.

Wang, Y.; Wang, Y.; Hosono, E.; Wang, K. and Zhou, H., "The Design of a $LiFePO_4$/Carbon Nanocomposite With a Core-Shell Structure and Its Synthesis by an In Situ Polymerization Restriction Method." Angew. Chem. Int. Ed. 47, pp. 7461-7465, 2008.

Wang, L.; Zhou, F. and Ceder, G., "Ab Initio Study of the Surface Properties and Nanoscale Effects of $LiMnPO_4$." Electrochem. Solid State Lett. 11, A94-A96, 2008.

Zaghib, K.; Mauger, A.; Fendron, F.; Massot, M. and Julien, C. M., "Insertion Properties of $LiFe_{0.5}Mn_{0.5}PO_4$ Electrode Materials for Li-ion Batteries." Ionics 14, pp. 371-376, 2008.

Sun, X.; Liu, Z.; Welsher, K.; Robinson, J. T.; Goodwin, A.; Zaric, S. and Dai, H., "Nano-Graphene Oxide for Cellular Imaging and Drug Deliver." Nano Res., 1(3), pp. 203-212, 2008.

Guo, Y.; Hu, J. and Wan, L., "Nanostructured Materials for Electrochemical Energy Conversion and Storage Devices." Adv. Mater., 20, pp. 2878-2887, 2008.

Li, Y.; Tan, B. and Wu, Y., "Exploring Nanowire Arrays and Graphene Hybrid Materials for Lithium Battery." Nano Lett., 8, pp. 265-270, 2008.

Stoller, M. D.; Park, S.; Zhu, Y.; An, J. and Ruoff, R. S., "Graphene-Based Ultracapacitors." Nano Letters, vol. 8, No. 10, pp. 3498-3502, 2008.

Armand, M. and Tarascon, J., "Building Better Batteries." Nature, vol. 451, pp. 652-657, 2008.

Wang, H.; Wang, X.; Li, X. and Dai, H., "Chemical Self-Assembly of Graphene Sheets." Nano Res. vol. 2, pp. 336-342, 2009.

Mkhoyan, K. A.; Contryman, A. W.; Silcox, J.; Stewart, D. A.; Eda, G.; Mattevi, C.; Miller, S. and Chhowalla, M., "Atomic and Electronic Structure of Graphene-Oxide." Nano Lett 9, pp. 1058-1063, 2009.

Wang, Y.; Shi, Z.; Huang, Y.; Ma, Y.; Wang, C.; Chen, M. and Chen, Y., "Supercapacitor Devices Based on Graphene Materials." J. Phys. Chem. C, 113, pp. 13103-13107, 2009.

Meduri, P.; Pendyala, C.; Kumar, V.; Sumanasekera, G. U. and Sunkara,.M. K., "Hybrid Tin Oxide Nanowires as Stable and High Capacity Anodes for Li-Ion Batteries." Nano Lett., 9, pp. 612-616, 2009.

Ko, J. M. and Kim, K. M., "Electrochemical Properties of $MnO_2$/Activated Carbon Nanotube Composite as an Electrode Material for Supercapacitor." Materials Chemistry and Physics, 114, pp. 837-841, 2009.

Wang, H.; Wang, X.; Li, X. and Dai, H., "Chemical Slef-Assembly of Graphene Sheets." Nano Res, 2, pp. 336-342, 2009.

Murugan, A. V.; Muraliganth, T.; Ferreira, P. J and Manthiram, A., "Dimensionally Modulated, Single-Crystalline $LiMPO_4$ (M=Mn, Fe, Co, and Ni) with Nano-Thumblike Shapes for High-Power Energy Storage." Inorg. Chem. 48, pp. 946-952, 2009.

Kang, B. and Ceder, G., "Battery Materials for Ultrafast Charging and Discharging." Nature, 458, pp. 190-193, 2009.

Martha, S. K.; Markovsky, B.; Grinblat, J.; Gofer, Y.; Haik, O.; Zinigrad, E.; Aurbach, D.; Drezen, T.; Wang, D.; Deghenghi, G. and Exnar, I., "$LiMnPO_4$ as an Advanced Cathode Material for Rechargeable Lithium Batteries." J. Electrochem. Soc. 156, A541-A552, 2009.

Park, S. and Ruoff, R. S., "Chemical Methods for the Production of Graphenes." Nature Nanotechnol. 4, pp. 217-224, 2009.

Yang, X.; Zhang, X.; Ma, Y.; Huang, Y.; Wang, Y. and Chen, Y., "Superparamagnetic Graphene Oxide-$Fe_3O_4$ Nanoparticles Hybrid for Controlled Targeted Drug Carriers." J. Mater. Chem, 19, pp. 2710-2714, 2009.

Kong, L.; Lang, J.; Liu, M.; Luo, Y. and Kang, L., "Facile Approach to Prepare Loose-Packed Cobalt Hydroxide Nano-Flakes Materials for Electrochemical Camacitors." J. Power Sources, 194, pp. 1194-1201, 2009.

Lang, J.; Kong, L.; Wu, W.; Liu, M. and Luo, Y., "A Facile Approach to the Preparation of Loose-Packed $Ni(OH)_2$ Nanoflake Materials for Electrochemical Capacitors." J. Solid State Electrochem., 13, pp. 333-340, 2009.

Wang, D.; Choi, D.; Li, J.; Yang, Z.; Nie, Z.; Kou, R.; Hu, D.; Wang, C.; Saraf, L. V.; Zhang, J.; Aksay, I. A. and Liu, J., "Self-Assembled $TiO_2$-Graphene Hybrid Nanostructures for Enhanced Li-Ion Insertion." ACS Nano, 3, pp. 907-914, 2009.

Lim, B.; Jiang, M.; Camargo, P. H. C.; Cho, E.C.; Tao, J.; Lu, X.; Zhu, Y. and Xia,Y., "Pd-Pt Bimetallic Nanodendrites with High Activity for Oxygen Reduction." Science 324, pp. 1302-1305, 2009.

Ji, X.; Lee, K. T. and Nazar, L. F., "A Highly Ordered Nanostructured Carbon-Sulphur Cathode for Lithium-Sulphur Batteries." Nat. Mater., 8, pp. 500-506, 2009.

Cui, L.; Ruffo, R.; Chan, C. K.; Peng, H. and Cui, Y., "Crystalline-Amorphous Core-Shell Silicon Nanowires for High Capacity and High Current Battery Electrodes." Nano Lett., 9, pp. 491-495, 2009.

Lang, J.; Kong, L.; Liu, M.; Luo, Y. and Kang, L., "Asymmetric Supercapacitors Based on Stabilized~-$Ni(OH)_2$ and Activated Carbon." J. Solid State Electrochem., 14, pp. 1533-1539, 2010.

Ellis, B. L.; Lee, K. T. and Nazar, L. F., "Positive Electrode Materials for Li-Ion and Li-Batteries." Chem. Mater. 22, pp. 691-714, 2010.

Bakenov, Z. and Taniguchi, I., "Physical and Electrochemical Properties of $LiMnPO_4$/C Composite Cathode Prepared with Different Conductive Carbons." J. Power Sources 195, pp. 7445-7451, 2010.

Kang, B. and Cedar, G., "Electrochemical Performance of $LiMnPO_4$ Synthesized with Off-Stoichiometry." J. Electrochem. Soc. 157, pp. A808-A811, 2010.

Wang, H.; Robinson, J. T.; Diankov, G. and Dai, H., "Nanocrystal Growth on Grahene with Various Degrees of Oxidation." J. Am. Chem. Soc. 132, pp. 3270-3271, 2010.

Liang, Y.; Wang, H.; Casalongue, H. S.; Chen, Z. and Dai, H., "$TiO_2$ Nanocrystals Grown on Graphene as Advanced Photocatalytic Hybrid Materials." Nano Res. 3, pp. 701-705, 2010.

(56) References Cited

OTHER PUBLICATIONS

Wang, H.; Sanchez Casalongue, H.; Liang, Y. and Dai, H., "Ni(OH)2 Nanoplates Grown on Graphene as Advanced Electrochemical Pseudocapacitor Materials." *J. Am. Chem. Soc.* 132, pp. 7472-7477, 2010.

Wang, H.; Cui, L.; Yang, Y.; Casalongue, H. S.; Robinson, J. T.; Liang, Y.; Cui, Y. and Dai, H., "Mn3O4—Graphene Hybrid as a High-Capacity Anode Material for Lithium Ion Batteries." *J. Am. Chem. Soc.* 132, pp. 13978-13980, 2010.

Yang, S.; Cui, G.; Pang, S.; Cao, Q.; Kolb, U.; Feng, X.; Maier, J. and Mullen, K., "Fabrication of Cobalt and Cobalt Oxide/Graphene Composties: Towards High-Performance Anode Materials for Lithium Ion Batteries." *ChemSusChem* 3, pp. 236-239, 2010.

Ye, J.; Zhang, H.; Yang, R.; Li, X. and Qi, L., "Morphology-Controlled Synthesis of SnO2 Nanotubes by Using 1D Silica Mesostructures as Sacrificial Templates and Their Application in Lithium-Ion Batteries." *Small* 6, pp. 296-306, 2010.

Ban, C.; Wu, Z.; Gillespie, D. T.; Chen, L.; Yan, Y.; Blackburn, J. L. and Dillon, A. C., "Nanostructured Fe3O4/SWNT Electrode: Binder-Free and High-Rate Li-Ion Anode." *Adv. Mater.*, 22, pp. E145-E149, 2010.

Wu, Z.; Ren, W.; Wen, L.; Gao, L.; Zhao, J.; Chen, Z.; Zhou, G.; Li, F. and Cheng, H., "Graphene Anchored with Co3O4 Nanoparticles as Anode of Lithium Ion Batteries with Enhanced Reversible Capacity and Cyclic Performance." *ACS Nano*, 4, pp. 3187-3194, 2010.

Zhou, G.; Wang, D.; Li, F.; Zhang, L.; Li, N.; Wu, Z.; Wen, L.; Lu, G. Q. and Cheng, H., "Graphene-Wrapped Fe3O4 Anode Material with Improved Reversible Capacity and Cyclic Stability for Lithium Ion Batteries." *Chem. Mater.*, 22, pp. 5306-5313, 2010.

Eda, G.; Lin, Y.; Mattevi, C.; Yamaguchi, H.; Chen, H.; Chen, I.; Chen, C. and Chhowalla, M., "Blue Photoluminescence from Chemically Derived Graphene Oxide." *Adv. Mater.* 22, pp. 505-509, 2010.

Wu, Z.; Ren, W.; Wang, D.; Li, F.; Liu, B. and Cheng, H., "High-Energy MnO2 Nanowire/Graphene and Graphene Asymmetric Electrochemical Capacitors." *ACS Nano*, 4, pp. 5835-5842, 2010.

An, X.; Simmons, T.; Shah, R.; Wolfe, C.; Lewis, K. M.; Washington, M.; Nayak, S.; Talapatra, S. and Kar, S., "Stable Aqueous Dispersions of Noncovalently Functionalized Graphene from Graphite and their Multifunctional High-Performance Applications." *Nano Lett.*, 10, pp. 4295-4301, 2010.

Wu, Z.; Wang, D.; Ren, W.; Zhao, J.; Zhou, G.; Li, F. and Cheng, H., "Anchoring Hydrous RuO2 on Graphene Sheets for High-Performance Electrochemical Capacitors." *Adv. Funct. Mater.*, 20, pp. 3595-3602, 2010.

Chen, P.; Chen, H.; Qiu, J. and Zhou, C., "Inkjet Printing of Single-Walled Carbon Nanotube/RuO2 Nanowire Supercapacitors on Cloth Fabrics and Flexible Substrates." *Nano Res.*, 3, pp. 594-603, 2010.

Ji, X. and Nazar, L. F., "Advances in Li-S Batteries." *J. Mater. Chem.* 20, pp. 9821-9826, 2010.

Yang, Y.; McDowell, M. T.; Jackson, A.; Cha, J. J.; Hong, S. S. and Cui, Y., "New Nanostructured Li2S/Silicon Rechargeable Battery with High Specific Energy." *Nano Lett.*, 10, pp. 1486-1491, 2010.

Kim, H.; Kim, S.; Park, Y.; Gwon, H.; Seo, D.; Kim, Y. and Kang, K., "SnO2/Graphene Composite with High Lithium Storage Capability for Lithium Rechargeable Batteries." *Nano Res.*, 3, pp. 813-821, 2010.

Hailang Wang, et al., "Graphene-Wrapped Sulfur Particles as a Rechargeable Lithium—Sulfer Battery Cathode Material with High Capacity and Cycling Stability," Nano Lett., 11, pp. 2644-2647, 2011.

Hailang Wang, et al., "$C_{o1-x}S$-Graphene Hybrid: A High-Performance Metal Chalcogenide Electrocatalyst for Oxygen Reduction," Angew. Chem. Int. Ed. 50, pp. 10969-10972, 2011.

Yanguang Li, et al., "$MoS_2$ Nanoparticles Grown on Graphene: An Advanced Catalyst for the Hydrogen Evolution Reaction," J. Am. Chem. Soc. 133, pp. 7296-7299, 2011.

Yongye Liang, et al., Covalent Hybrid of Spinel Manganese-Cobalt Oxide and Graphene as Advanced Oxygen Reduction Electrocatalysts, J. Am. Chem. Soc., pp. 1-8, 2012.

* cited by examiner

GRAPHENE HYBRID MATERIALS, APPARATUSES, SYSTEMS AND METHODS

FEDERALLY-SPONSORED RESEARCH AND DEVELOPMENT

This invention was made with Government support under contract N00014-08-1-0860 awarded by the Office of Naval Research. The Government has certain rights in this invention.

RELATED DOCUMENTS

This patent document claims benefit under 35 U.S.C. §119 to U.S. Provisional Patent Application Ser. No. 61/444,480, entitled "Nanomaterial/Graphene Hybrid Material" and filed on Feb. 18, 2011; this patent document also claims benefit under 35 U.S.C. §119 to U.S. Provisional Patent Application Ser. No. 61/444,468, entitled "Nanocrystal-Graphene Hybrid Materials" and filed on Feb. 18, 2011; this patent document also claims benefit under 35 U.S.C. §119 to U.S. Provisional Patent Application Ser. No. 61/600,400, entitled "Graphene Sheet-Based Materials, Apparatuses and Methods Therefor" and filed on Feb. 17, 2012; this patent document and the Appendices filed in (and as part of) the underlying provisional applications, including the references cited therein, are fully incorporated herein by reference.

BACKGROUND

As a single-atom-thick carbon material with light weight, high surface area and high conductivity, graphene has been useful for a variety of applications. However, graphene has been challenging to implement in applications requiring certain combinations of structures and high performance, such as may relate to conductivity and other electrical characteristics. For example, graphite oxide remains highly resistive even after reduction, which can be undesirable in electrical applications, such as in energy storage applications.

Moreover, while a variety of materials may be desirable to implement in various articles and electrical devices, the practicable implementation of such materials has been limited. For instance, various nanomaterials exhibit certain characteristics that also make the materials difficult to work with and/or manufacture while achieving desirable performance.

These and other matters continue to present challenges to the implementation of graphene and other materials.

SUMMARY

Various example embodiments are directed to graphene-based materials, apparatuses, systems and methods, such as those mentioned above.

In accordance with one or more embodiments, an electrode or terminal-type structure includes a single-crystal structure grown on a graphene sheet. Various embodiments are directed to the manufacture of such a single-crystal structure upon a graphene sheet. In various implementations, the oxygen content of the graphene sheet is set, selected or otherwise controlled to facilitate single-crystalline growth.

In a more particular embodiment, a single-crystal structure is grown on a graphene sheet as follows. Precursor particles located at respective portions of a graphene sheet are used to form nanoparticles at the locations. The nanoparticles are diffused and recrystallized to form the single-crystal structure on the surface of the graphene sheet.

Other example embodiments are directed to one or more of electrodes, terminals, batteries, supercapacitors and other charge-storage devices. In each of these embodiments, a graphene-based sheet is used with a material grown thereupon.

The above discussion is not intended to describe each embodiment or every implementation of the present disclosure. The figures and following description also exemplify various embodiments.

BRIEF DESCRIPTION OF THE DRAWINGS

The disclosure may be more completely understood in consideration of the detailed description of various embodiments of the disclosure that follows in connection with the drawings, each being consistent with one or more of these embodiments, in which

FIGS. 2a-2f show nanoplates grown on a graphene-based sheet (GS) according to various embodiments of the present disclosure, and in which FIGS. 2a and 2b depict $Ni(OH)_2$/GS, FIG. 2c shows a low magnification image of $Ni(OH)_2$/GS, FIG. 2d depicts individual hexagonal $Ni(OH)_2$ nanoplates on GS, inset, fast Fourier transform of the lattice fringes in (d), FIG. 2e shows the thickness of an occasionally vertically aligned $Ni(OH)_2$ nanoplate, and FIG. 2f illustrates an XRD spectrum of a packed thick film of hexagonal $Ni(OH)_2$ nanoplates on GS;

FIGS. 3a-3d show $Ni(OH)_2$ nanoparticles formed on sheets, in accordance with one or more example embodiments in which FIGS. 3a and 3b depict $Ni(OH)_2$/GS, and FIGS. 3c and 3d respectively show low and high magnification images of $Ni(OH)_2$/GO with an inset shown of an electronic diffraction pattern of $Ni(OH)_2$ on GO;

FIGS. 4a-4f show $Ni(OH)_2$ nanoplates grown on GS, in accordance with one or more example embodiments in which FIG. 4a depicts a schematic drawing of $Ni(OH)_2$ nanoplates/GS composite packed on a Pt working electrode with an electrolyte, FIG. 4b shows CV curves of $Ni(OH)_2$ nanoplates/GS composite at various scan rates, FIG. 4c shows average specific capacitance of $Ni(OH)_2$ nanoplates grown on GS also at various scan rates, FIG. 4d shows average specific capacitance calculated from CV curves versus cyclic number of $Ni(OH)_2$ nanoplates grown on GS at a scan rate of 40 mV/s, FIG. 4e shows contact current discharge curves of $Ni(OH)_2$ nanoplates grown on GS at various discharge current densities, and FIG. 4f particularly shows the constant current charge and discharge curves of $Ni(OH)_2$ nanoplates grown on GS at a current density of 50 A/g;

FIGS. 6a-6d are plots showing XRD diffusion of composites by degree, consistent with other example embodiments in which FIG. 6a shows an as-made (first step reaction) GSI $Ni(OH)_2 \cdot 0.75H_2O$, FIG. 6b shows hydrothermally derived (second step reaction) GS/$Ni(OH)_2$ composites, FIG. 6c shows XRD of as-made (first step reaction) composites on graphene, and FIG. 6d shows hydrothermally derived (second step reaction) GO/nickel composites;

FIGS. 7a-7d show scanning auger electron spectroscopy characterizations of hydrothermally-derived Ni(OH)$_2$/GS composite, in accordance with other example embodiments and in which FIG. 7a is an SEM image of several pieces of Ni(OH)$_2$/GS, FIG. 7b is an overlay of FIGS. 7c and 7d, and FIGS. 7c-7d show auger mapping of the structure of FIG. 7a for Ni and C elements;

FIGS. 8a-8f show SEM characterizations of GS/Fe$_2$O$_3$ and GO/Fe$_2$O$_3$ composites, consistent with example embodiments of the present disclosure in which FIGS. 8a-8b depict low and high magnification SEM images of an as-made GS/Fe$_2$O$_3$ composite, FIG. 8c shows an SEM image of the composite after hydrothermal reaction at 120° C., FIGS. 8d-8e show low and high magnification images of as-made GO/Fe$_2$O$_3$ after a first step of reaction at 80° C., and FIG. 8f shows an SEM image of the aforementioned composite after the second-step hydrothermal reaction at 120° C.;

FIGS. 9a-9d show a scanning auger electron spectroscopy characterization of hydrothermally-derived Fe$_2$O$_3$/GS composite, consistent with further embodiments of the present disclosure in which FIG. 9a shows an SEM image of Fe$_2$O$_3$/GS, FIG. 9b depicts an overlay of FIGS. 9c-9d, FIGS. 9c-9d depict auger mapping of the structure of FIG. 9a for an Fe element of FIG. 9c;

FIGS. 10a-10f show SEM characterization of the GS/Co(OH)$_2$ and GO/Co(OH)$_2$ composites, consistent with other embodiments of the present disclosure in which FIGS. 10a-10b depict low and high magnification SEM images of an as-made GS/Co(OH)$_2$ composite, FIG. 10c shows an SEM image of this composite after hydrothermal reaction at 80° C., FIGS. 10d-10e show low and high magnification images of as-made GO/Co(OH)$_2$ after reaction at 50° C., and FIG. 10f shows an SEM image of the aforementioned composite after the second-step hydrothermal reaction at 80° C.;

FIGS. 11a-11d show scanning auger electron spectroscopy characterization of a hydrothermally-derived CoO(OH)/GS composite, consistent with other embodiments of the present disclosure in which FIG. 11a shows an SEM image of CoO(OH)/GS, FIG. 11b depicts an overlay of FIGS. 11c-11d, FIGS. 11c-11d depict auger mapping of the structure of FIG. 11a for Co and C, FIGS. 12a-12d depict an electrochemical characterization of Ni(OH)$_2$ nanoplates/GS composite, according to further embodiments of the present disclosure in which FIG. 12a shows CV curves of Ni(OH)$_2$ nanoplates/composite at various scan rates, FIG. 12b shows the average specific capacitance of Ni(OH)$_2$ nanoplates grown on GS at various scan rates, FIG. 12c graphs average specific capacitance, and FIG. 12d shows the CV curves of the Ni(OH)$_2$ nanoplates/composite;

FIGS. 13a-13d depict CV curves of hydrothermally-derived GO/Ni(OH)$_2$ composites at various scan rates, according to other embodiments of the present disclosure in which FIG. 13a shows a first-step reaction, FIGS. 13b and 13d show average specific capacitance of the as-made and hydrothermally-derived GO/Ni(OH)$_2$ composites, and FIG. 13c shows a second-step reaction of the of hydrothermally-derived GO/Ni(OH)$_2$ composites, FIGS. 14a-14d show SEM images and other graphs depicting Ni(OH)$_2$ nanoplates mixed with GS, according to other example embodiments of the present disclosure in which FIG. 14a shows an SEM image of hydrothermally derived Ni(OH)$_2$ nanoplates, FIG. 14b shows a mixture of the nanoplates with GS, and FIGS. 14c and 14d respectively show the CV curves and the average specific capacitance of the simple mixture at various scan rates

Figure 1:
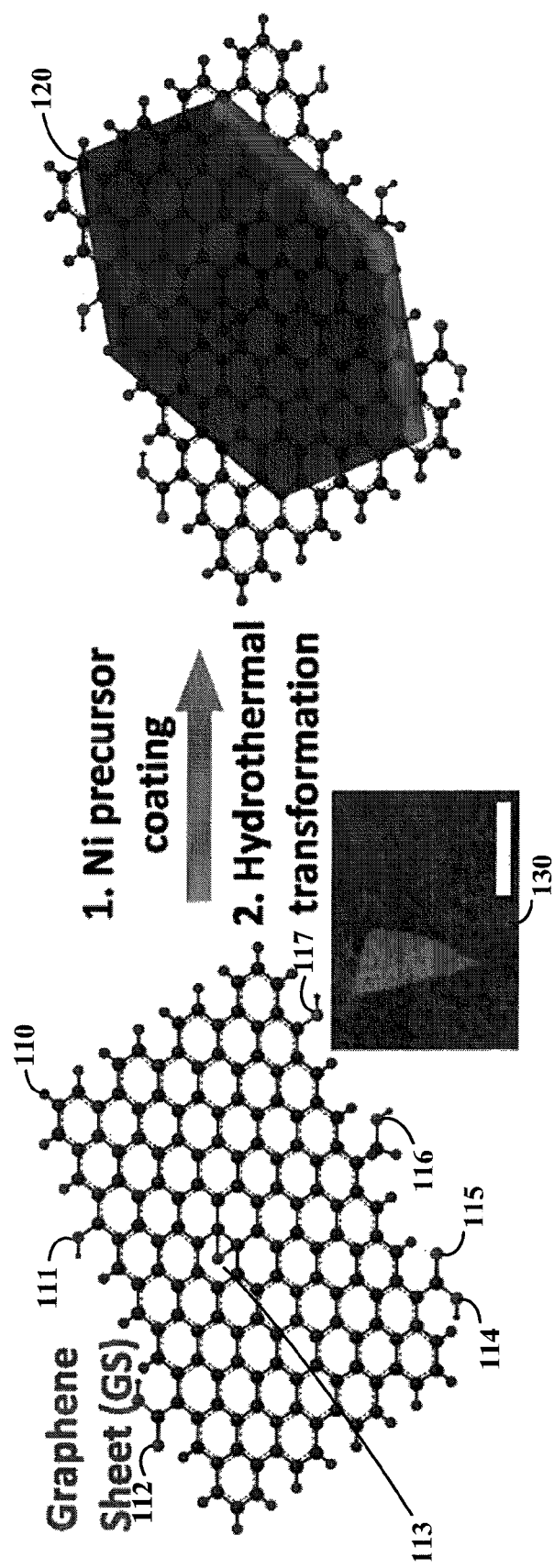
FIG. 1 shows a schematic two-step $Ni(OH)_2$ nanocrystal growth on graphene sheets, in accordance with one or more example embodiments.

While the disclosure is amenable to various modifications and alternative forms, specifics thereof have been shown by way of example in the drawings and are described in detail herein (and including in the Appendices filed in the underlying provisional application). It should be understood that the intention is not to necessarily limit the disclosure to the particular embodiments described. On the contrary, the intention is to cover all modifications, equivalents, and alternatives falling within the spirit and scope of the disclosure.

DETAILED DESCRIPTION

The present disclosure is related to methods and apparatuses directed to graphene-based methodologies and structures, such as those directed to power-density devices, energy storage, energy conversion, electron transport, electrodes, supercapacitors and batteries, as well as methods and devices in and stemming from the disclosures in the above-referenced provisional patent document.

Certain aspects of the disclosure are directed to carbon material used as substrates for various types of electronics manufacturing and/or electronic devices. For example, as a single-atom thick carbon material with light weight and high surface area and conductivity, graphene-based substrates are used for growing and anchoring of single crystal structures.

More specific example embodiments are directed to apparatuses and methods involving graphene-based sheets with nanocrystals grown thereupon. Oxygen content (e.g., via oxidation) of a graphene sheet may be controlled to suit particular applications, such as by minimizing (e.g., mitigating or practically prohibiting) oxidation. In some embodiments, the oxygen content is controlled to facilitate the subsequent growth of single crystalline material on the graphene sheet, via the combination of nanoparticles on a surface of the graphene sheet. In such embodiments, the oxygen content is controlled to ensure that surface oxidation does not mitigate the single-crystalline growth. Such approaches may, for example, be carried out in connection with the approaches shown in and described in connection with Appendix A in the above-referenced patent document Ser. No. 61/444,480. The graphene sheets as discussed above and otherwise herein can be implemented in a variety of manners. Some embodiments are directed to graphene sheets that are in a planar-type arrangement. Other embodiments are directed to stacked graphene sheets. Still other embodiments are directed to rolled graphene sheets in the form of carbon nanotubes (e.g., single-walled nanotubes and/or multi-walled nanotubes).

According to certain specific embodiments and applications, single-crystal material is grown on graphene to facilitate a significantly enhanced electron transport rate, electrolyte contact area and structural stability, all of which facilitate fast energy storage and conversion applications. These nanocrystals (or related structures) interact with the graphene to form a hybrid-type material. Other aspects are directed to and involve the synthesis of nanocrystals on more pristine graphene with high electrical conductivity and controlling the morphologies of the nanocrystals for desired properties and applications. In one such application, a general two-step method is used to grow hydroxide and oxide nanocrystals of the iron family elements (Ni, Co, Fe) on graphene with various degrees of oxidation.

In certain embodiments, different nanocrystal growth behaviors are observed on low oxidation graphene sheets (GS) and highly oxidized GO in hydrothermal reactions. Small particles are pre-coated on GS, diffused and recrystallized into single-crystalline nanoplates or nanorods with well-defined shapes.

Aspects of the present disclosure are directed to graphene plates having one or more different types of materials thereupon, as may be grown via single-crystal growth described herein. Such materials may include, for example, graphene sheets in a generally one-dimensional format (e.g., in a planar shape), or graphene sheets in other shapes such as a tubular sheet (e.g., as in a graphene sheet rolled into a nanotube). Materials that may be coupled to such sheets (e.g., via single-crystalline growth as facilitated via oxidation/oxide growth limitation) include $Ni(OH)_2$, $Mn_3O_4$, $LiMn_{1-x}Fe_xPO_4$, NiFe, $Fe/Mn_2CO_4$, $Co_2MnO_4$, $FeO_x$ and iron family elements such as Ni, Co, Mn, Mo, Ru and Fe.

Various embodiments are directed to a plurality of graphene sheets having $Ni(OH)_2$ structures grown thereupon, with the $Ni(OH)_2/GS$ sheets being packed into thick layers to form electrochemical pseudo-capacitors with a stable capacitance >1000 F/g at an ultra-high discharge current density of 50 A/g. Such $Ni(OH)_2/GS$ sheets may be referred to as nanoplates, having planar dimensions of several hundred nanometers with a thickness of a few (e.g., 10) nanometers. Full charging/discharging at a specific capacity of 156 mAh/g can be achieved in ~11 seconds. The high capacity and ultrafast rates are facilitated by the structure of electrochemically active $Ni(OH)_2$ structures on GS, allowing for efficient charging/discharging of individual in a macroscopic ensemble through the conducting, interconnected graphene network.

Other aspects of the present disclosure are directed to graphene-based materials and their implementation with a multitude of devices and systems. Various example embodiments are directed to supercapacitors, batteries such as lithium-ion and lithium-sulfur batteries, air electrodes and their implementation as metal-air batteries and fuel cells. Graphene-based materials such as the graphene-hybrid sheets discussed herein are implemented as an electrode or terminal with these devices and/or with systems employing the devices. For instance, a graphene-based sheet can be implemented as an anode or cathode, using one or more materials as discussed above.

Various example embodiments are directed to graphene sheets implemented as an electrode or terminal for a supercapacitor. The graphene sheet includes a single-crystal structure grown thereupon, with the graphene sheet being configured and arranged to collect current. The supercapacitor includes a second electrode and a separator between the first and second electrodes, the separator facilitating ion exchange between the electrodes.

In some embodiments, the single-crystal structure is a pseudocapacitive material configured and arranged with the graphene sheet to exhibit specific capacitance and energy density that is higher than a specific capacitance and energy capacity of the graphene sheet. More particular embodiments are directed to supercapacitors in which the single-crystal structure includes $Ni(OH)_2$. In other particular embodiments, a plurality of such graphene sheets overlap one another to form a three-dimensional conducting network that transfers electrons between the graphene sheets and a separator.

Another embodiment is directed to an asymmetrical supercapacitor, with an electrode as having a graphene sheet with single-crystal structure thereupon as discussed above, and another electrode including a $RuO_2$ graphene hybrid material with $RuO_2$ grown on a graphene sheet. The electrodes are separated by a separator material. In some implementations, the single-crystal material in the first electrode includes $Ni(OH)_2$.

In accordance with another example embodiment, an energy-storage apparatus includes a hybrid structure including an anode and a cathode. The anode includes $FeO_x$ nanoparticles grown on a graphene sheet, and the cathode includes $Ni(OH)_2$ nanoplates grown on oxidized multi-wall carbon nanotubes (MWNTs).

Various example embodiments are directed to lithium-ion electrodes and batteries including a graphene-based sheet and material thereon as discussed herein. In one embodiment, a lithium-ion battery includes first and second electrodes separated by an electrolyte, with the first electrode including a graphene sheet and a single-crystal active material grown on the graphene sheet. The electrolyte facilitates the passage of lithium ions between the electrodes.

A more particular example embodiment is directed to a lithium-ion electrode, such as discussed above, the single-crystal active material includes $Mn_3O_4$ and is configured and arranged to interact with lithium ions from lithium-based material in the second electrode for passing charge carriers between the electrodes.

Another more particular example is directed to a lithium-ion electrode, such as discussed above, in which the active material includes $LiMn_{1-x}Fe_xPO_4$ Nanorods that facilitate diffusion of lithium charge carriers between the first and second electrodes.

In various embodiments, an electrode or terminal-type structure as discussed herein is formed as follows, with other embodiments directed to the electrode or terminal-type structure. Precursor particles are used to form nanoparticles at respective locations on a graphene sheet. In some implementations, the precursor particles are pre-coated on the graphene sheet. The nanoparticles are diffused and recrystallized to form a single-crystal structure on a surface of the graphene sheet. The oxygen content of the graphene sheet can be set/selected or controlled to facilitate the single-crystal growth, such as with a graphene sheet having less than 20% oxygen, with a graphene sheet having less than 10% oxygen, or a graphene sheet having less than 5% oxygen. Moreover, the graphene sheet can be implemented in a variety of forms, such as in a planar form or a ruled sheet form (e.g., as in a nanotube). In some embodiments, diffusing and recrystallizing the nanoparticles includes diffusing the nanoparticles across a graphitic lattice of the graphene sheet and recrystallizing the nanoparticles into single-crystalline structures.

As discussed herein, the term "precursor" is used to differentiate other materials or particles such as used to form nanoparticles, with the nanoparticles having a composition that is different than the precursor particles from which they are formed. As discussed herein, for instance, certain precursor particles would involve a reagent used to form nanoparticles of a different composition. As a more specific example, various embodiments are directed to using Ni precursor particles to form $Ni(OH)_2$ by reacting the Ni precursor particles with a solution-based material.

Diffusing and recrystallizing nanoparticles is carried out in different manners, depending upon the application. In some embodiments, the nanoparticles are diffused across a graphitic lattice of the graphene sheet and are recrystallized into single-crystalline structures. A plurality of such graphene sheets with structures thereupon (e.g., nanoplates) can be stacked to form an electrochemical pseudo-capacitor electrode. For example, the nanoparticles can be hydrothermally treated to form at least one of hydroxide, oxide, sulfide and selenide nanocrystals, respectively of at least one of $Mn_3O_4$ nanoparticles and iron family elements selected from the group of Ni, Co, Mn, Mo, Ru and Fe.

In addition to controlling/selecting the oxygen content (e.g., oxidation) of the graphene sheet, the reaction temperature of the recrystallization is controlled in connection with some embodiments, and therein used to control the morphology of an electrode including the single-crystal structure. This approach can also be used to set capacitance and discharge current density values of an electrode.

Various example embodiments are directed to graphene sheets implemented as an electrode with lithium-sulfur, such as for batteries and other electrode applications. A particular example embodiment is directed to a graphene-sulfur hybrid material. Such a material may be implemented as an electrode, such as a battery terminal.

A more particular embodiment is directed to a lithium-sulfur energy storage apparatus having an anode and a sulfur-graphene hybrid cathode. The hybrid cathode includes a plurality of porous graphene-based sheets, and sulfur impregnated in pores of the porous graphene-based sheets. The sulfur-impregnated graphene-based sheets are configured and arranged to trap polysulfides during charging and discharging of the energy storage apparatus.

Another particular embodiment is directed to a lithium-sulfur battery apparatus including an anode, a cathode and an electrolyte. The cathode includes a plurality of sulfur particles coated with poly(ethylene glycol), and for each sulfur particle, a plurality of graphene sheets coupled to the sulfur particle. Each graphene sheet has carbon black nanoparticles thereupon, and is configured and arranged to move relative to the sulfur particles as the sulfur particles change in volume during discharge of the battery. The electrolyte facilitates the passage of lithium ions between the anode and cathode.

Other example embodiments are directed to air electrodes, and to apparatuses such as batteries and/or fuel cells that employ the air electrode. The air electrodes include a graphene sheet and a catalyst structure grown on the graphene sheet. The graphene sheet and catalyst structure are configured and arranged for use as an electrode terminal of the air electrode. The graphene sheet is configured and arranged with the catalyst structure to catalyze at least one of an oxygen reduction reaction (ORR) and an oxygen evolution reaction (OER). In some implementations, the graphene sheet is doped, such as with nitrogen or otherwise n-doped.

In a more particular embodiment, an apparatus employing the air electrode is a fuel cell having the air electrode, an electrolyte and a fuel electrode. The electrode terminal is configured and arranged to interact with air in the exchange of exchange ions with the fuel electrode via the electrolyte.

In another particular embodiment, an apparatus employing the air electrode is a battery having the air electrode as a cathode, an anode and an electrolyte. The air electrode terminal interacts with air to generate charge carriers, and facilitates the transport of the charge carriers to the electrode via the electrolyte.

A variety of materials may be used with the air electrode. In connection with various example embodiments, the catalyst structure includes one or more of $Co_3O_4$, $Co_{1-x}S$, $Mn_2CO_4$, $MnO_x$, NiFe, Fe and $Mn_2CO_4$. The catalyst structure may be implemented to catalyze an ORR or OER as discussed above. In various embodiments, the graphene sheet is a rolled sheet in the form of a nanotube.

Other more specific embodiments are directed to lithium-air electrodes, such as for rechargeable $Li—O_2$ Batteries. In such embodiments, the catalyst structure includes $Co_2MnO_4$, and the graphene sheet is configured and arranged with the $Co_2MnO_4$ to catalyze at least one of an oxygen reduction reaction (ORR) and an oxygen evolution reaction (OER).

Other example embodiments are directed to hydrogen reduction electrodes and/or apparatuses. One such embodiment is directed to an apparatus having a graphene sheet and $MoS_2$ nanoparticles grown on the graphene sheet. The $MoS_2$ nanoparticles and graphene sheet catalyze a hydrogen evolution reaction. In some implementations, the graphene sheet with the $MoS_2$ nanoparticles thereupon are coupled to an electrode of a hydrogen reduction cell.

Turning now to the figures, FIG. 1 shows a schematic multi-step (e.g., two-step) process in which $Ni(OH)_2$ nanocrystals are grown on graphene sheets, consistent with embodiments of the present disclosure. By way of example, a single graphene sheet 110 is shown in which the oxygen content thereof is controlled/limited to a few locations as labeled by way of example at 111-117. After a first step of reaction in which a Ni precursor is coated on the graphene sheet 110, a coating of $Ni(OH)_2 0.75H_2O$ is obtained. In connection with various embodiments, it has been observed/discovered that after the second step of reaction (hydrothermal transformation), the coating on the graphene sheet diffuses and recrystallizes into large single crystalline hexagonal $Ni(OH)_2$ structures 120, while such a coating on graphene oxide (e.g., greater that 5% or greater than 10% oxygen) remains as small nanoparticles pinned by functional groups on defects on the graphene oxide surface. The structure 120 may be referred to as a nanoplate, having a generally one-atom thickness and extending along the graphene sheet in a generally parallel (planar) arrangement.

Using this approach, a variety of single-crystal materials can be grown on a graphene sheet. Accordingly, the oxygen content (e.g., oxidation) of the graphene sheet can be controlled (e.g., limited) to facilitate single-crystalline growth along a lattice structure of the graphene sheet, therein mitigating effects of oxidation upon the single-crystal growth. The inset 130 shows an SEM image of the sheet.

Figure 2:
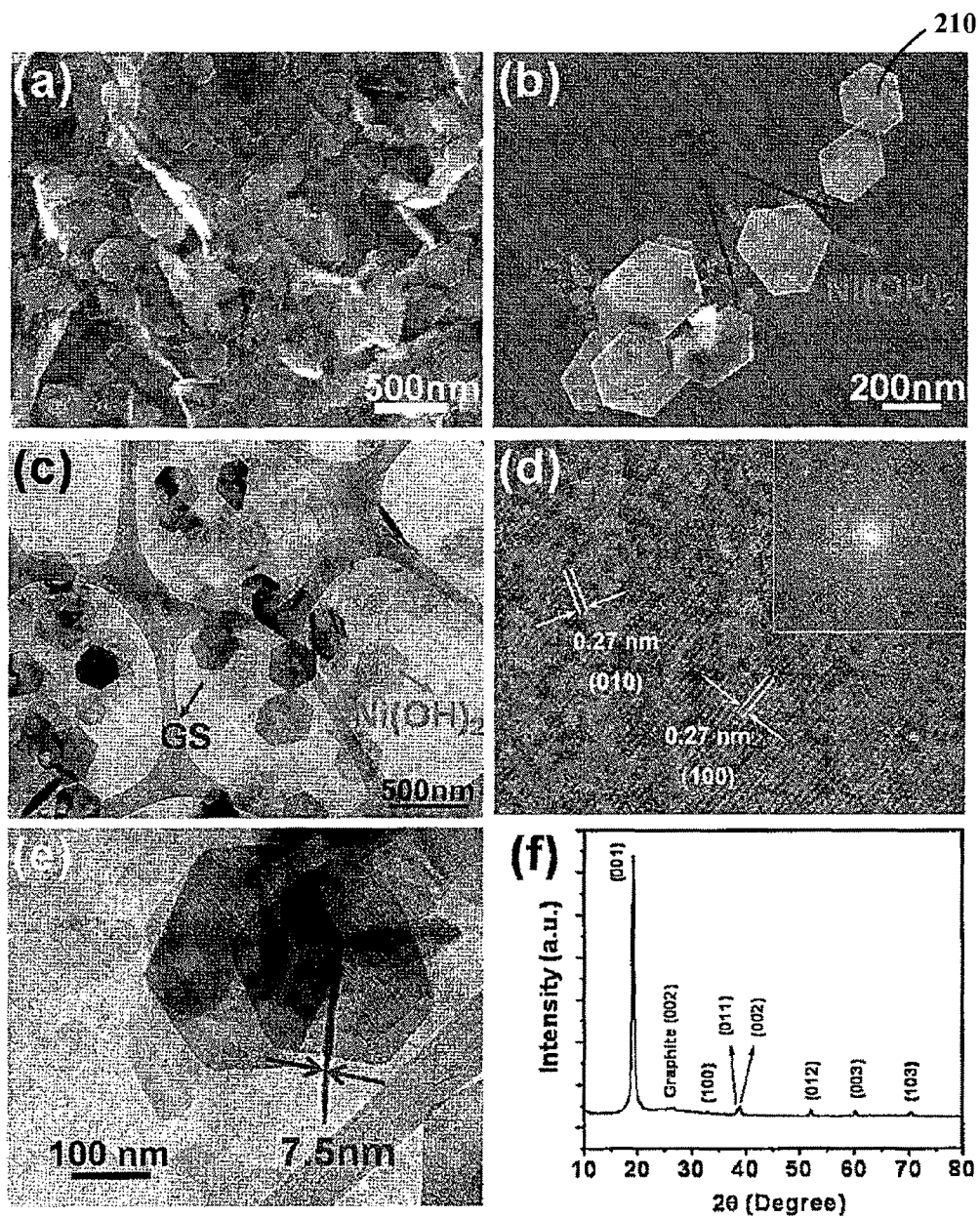

FIG. 2 shows hexagonal $Ni(OH)_2$ structures grown on graphene sheets (GS) and a related spectrographic plot, according to other embodiments of the present disclosure. FIGS. 2a and 2b depict SEM images of $Ni(OH)_2$/GS at different magnification levels, with an $Ni(OH)_2$ plate 210 labeled by way of example. FIG. 2c shows a low magnification TEM image of $Ni(OH)_2$/GS, in which $Ni(OH)_2$ nanoplates are supported on graphene sheets over holes on TEM grid. FIG. 2d depicts a high resolution TEM image of individual hexagonal $Ni(OH)_2$ nanoplates on GS, with the inset showing a fast Fourier transform of the lattice fringes in (d) and exhibiting hexagonal symmetry of the two-dimensional lattice of $\beta$-$Ni(OH)_2$ perpendicular to the (001) zone axis. FIG. 2e is a TEM image that shows the thickness of an occasionally vertically aligned $Ni(OH)_2$ nanoplate. FIG. 2f illustrates an x-ray diffractometry (XRD) spectrum of a packed thick film of hexagonal $Ni(OH)_2$ nanoplates on GS.

Figure 3:
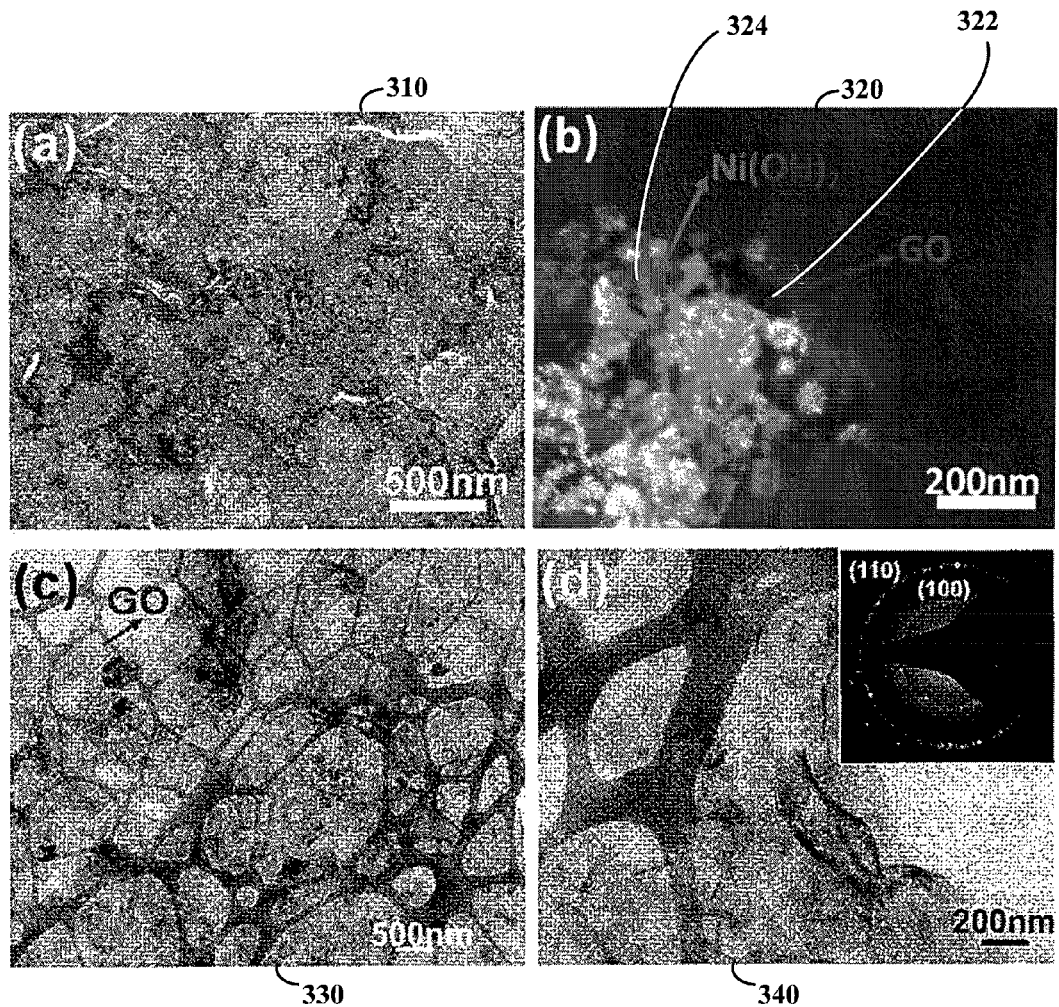

FIG. 3 shows $Ni(OH)_2$ nanoparticles formed on GO, consistent with other alternate embodiments of the present disclosure. FIGS. 3a and 3b depict SEM images of $Ni(OH)_2$/GO structures 310 and 320, and FIGS. 3c and 3d show low and high magnification TEM images of $Ni(OH)_2$/GO structures 330 and 340, with FIG. 3d showing an inset of an electronic diffraction pattern of $Ni(OH)_2$ on GO in (110) and (100) directions. For instance, FIG. 3b shows GO 322 and $Ni(OH)_2$ 324.

Figure 4:
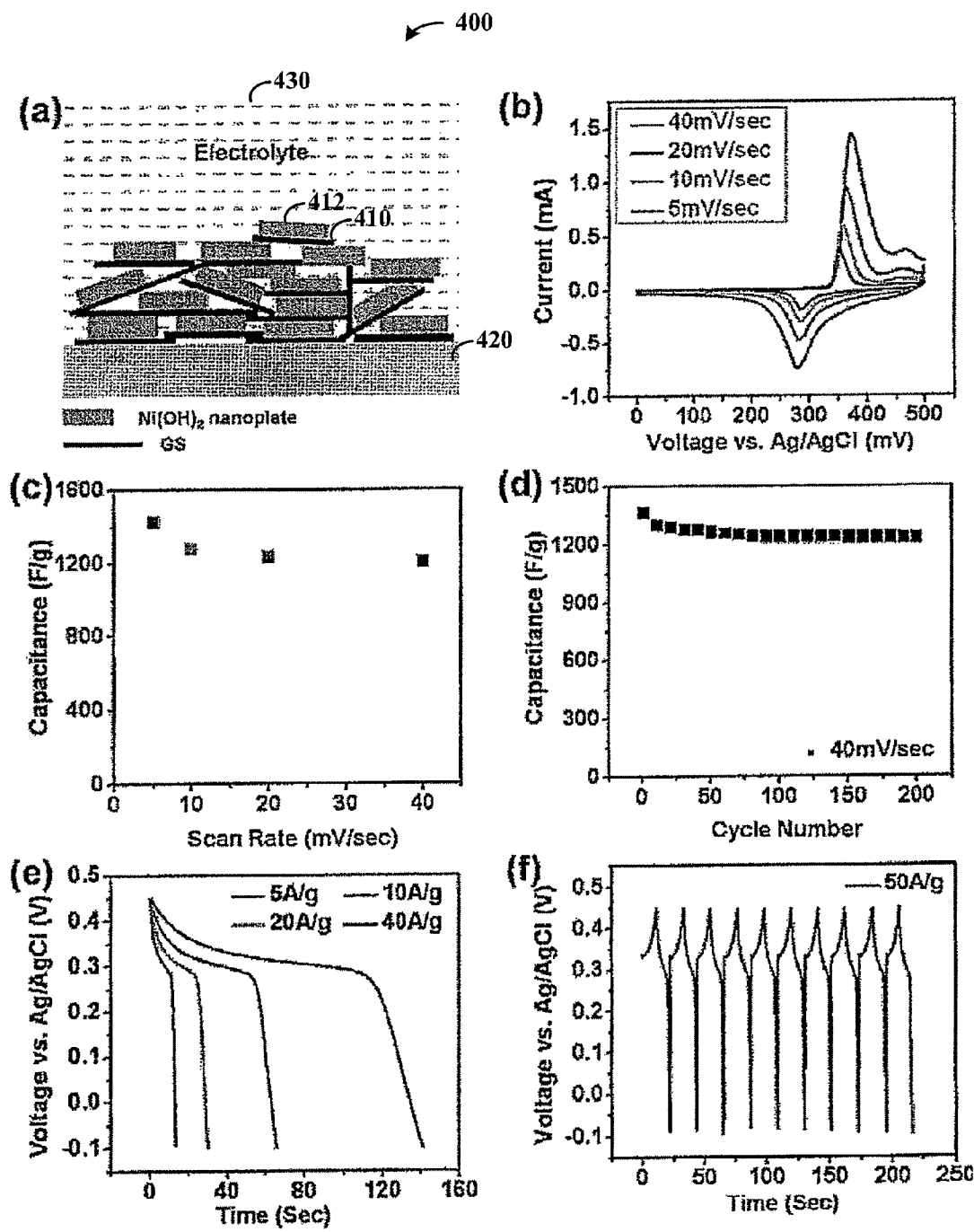

FIG. 4 shows an electrode 400 with $Ni(OH)_2$ nanoplates grown on GS as a high performance material for energy storage and conversion, consistent with additional embodiments of the present disclosure. Beginning with FIG. 4a, $Ni(OH)_2$ nanoplates/GS composite structures are packed on the Pt working electrode with an electrolyte, such as may be implemented with a supercapacitor or ion battery device. By way of example, graphene sheet 410 is labeled, and which has $Ni(OH)_2$ nanoplate 412 formed thereupon, with several of the nanoplate/graphene sheet structures stacked on a Pt electrode 420. The stacked structure is further exposed to an electrolyte 430 and exchanges ions therewith.

FIG. 4b shows CV curves of $Ni(OH)_2$ nanoplates/GS composite shown in FIG. 4a, at various scan rates. FIG. 4c graphs average specific capacitance of the $Ni(OH)_2$ nanoplates grown on GS also at various scan rates. FIG. 4d shows average specific capacitance calculated from CV curves versus cyclic number of the $Ni(OH)_2$ nanoplates grown on GS at a scan rate of 40 mV/s. FIG. 4e shows contact current discharge curves of the $Ni(OH)_2$ nanoplates grown on GS at various discharge current densities, whereas FIG. 4f particularly shows the constant current charge and discharge curves of $Ni(OH)_2$ nanoplates grown on GS at a current density of 50 A/g.

Figure 5:
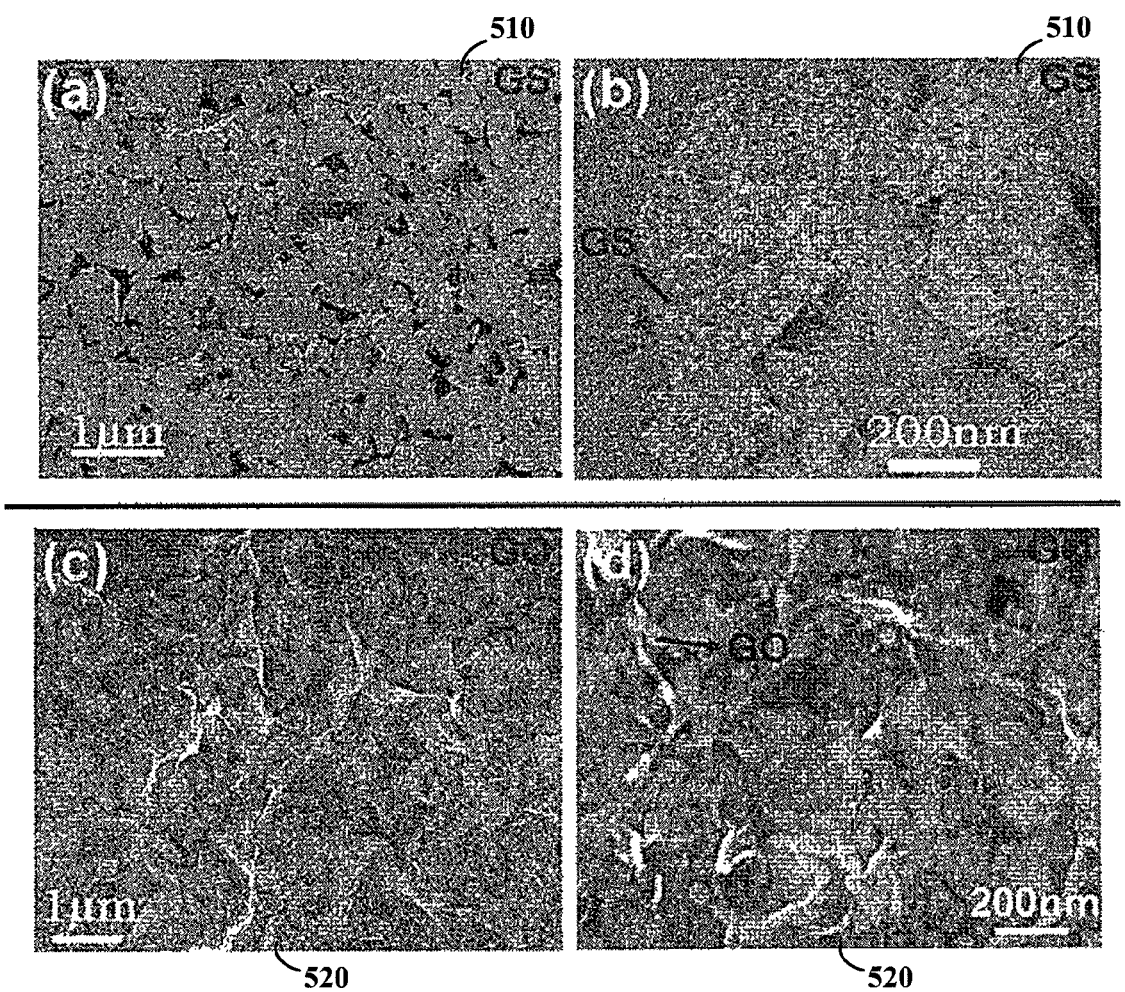
FIG. 5 (FIGS. 5a, 5b, 5c, 5d) shows SEM images of as-made GS/$Ni(OH)_2$, in accordance with another example embodiment.

FIG. 5 shows SEM images of as-made GS/$Ni(OH)_2$, consistent with other embodiments of the present disclosure. After the first step of reaction at 80° C., an aqueous $Ni(Ac)_2$ solution is injected to the GS (GO)/DMF suspension that was preheated to 80° C. Small nanoparticles are uniformly coated on both GS 510 (see, FIGS. 5a-5b), and GO 520 (see, FIGS. 5c-5d) by hydrolysis of the precursor, as shown with different magnification.

Figure 6:
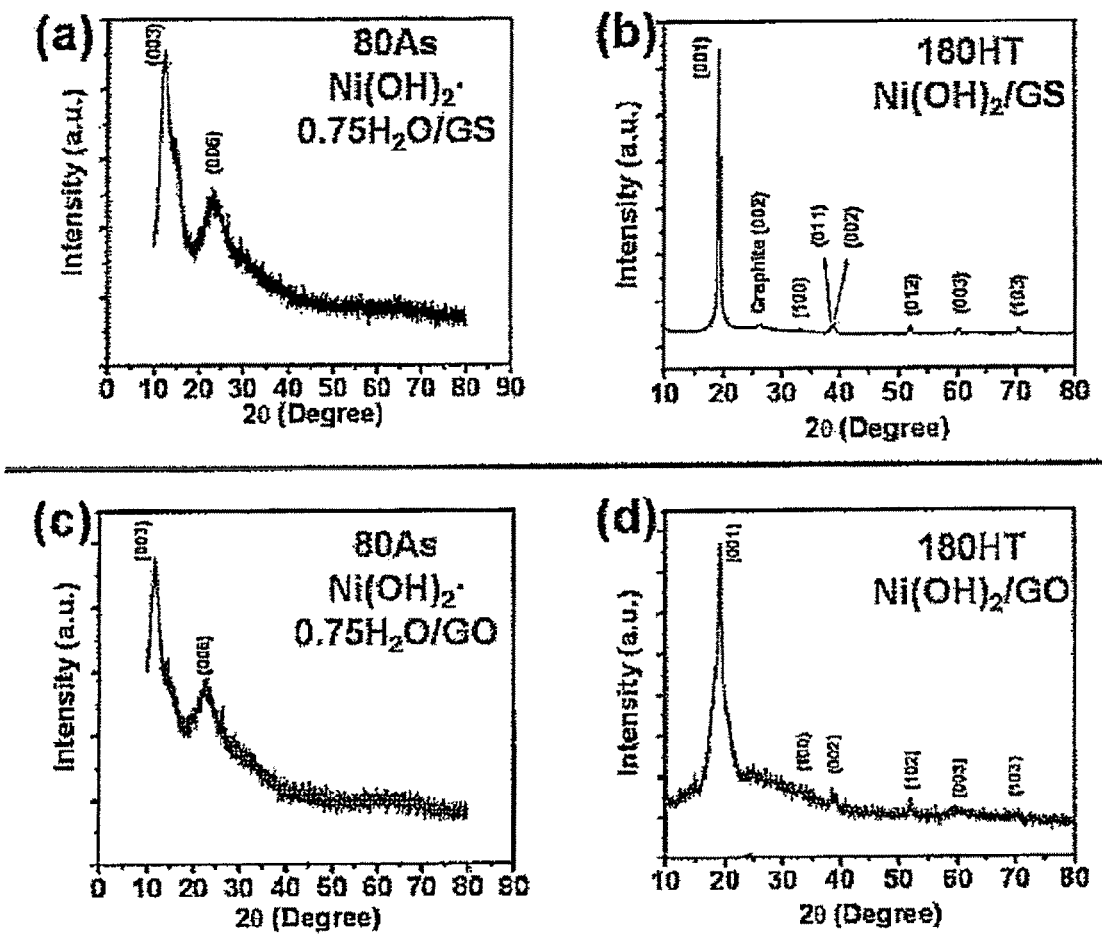

FIG. 6 shows XRD diffusion plots of composites by degree, consistent with other embodiments of the present disclosure. Consistent with one or more detailed/experimental embodiments, XRD of (FIG. 6a) as-made (first step reaction) GSl $Ni(OH)_2 \cdot 0.75H_2O$ and (FIG. 6b) hydrothermally derived (second step reaction) GS/$Ni(OH)_2$ composites. (FIG. 6c) XRD of as-made (first step reaction) and (FIG. 6d) hydrothermally derived (second step reaction) GO/nickel composites. After the first step of reaction at 80° C., both the GS and GO composites showed weak and broad peaks, corresponding to the same structure of small nanoparticles of $Ni(OH)_2 \cdot 0.75H_2O$ on the sheets. After the second-step hydrothermal reaction at 180° C., the products were $Ni(OH)_2$ as shown by XRD. The nanoplate $Ni(OH)_2$/GS composite showed stronger and narrower peaks than the nanoparticle $Ni(OH)_2$/GO composite due to higher degree of crystallinity and large single crystal sizes of the nanoplates.

Figure 7:
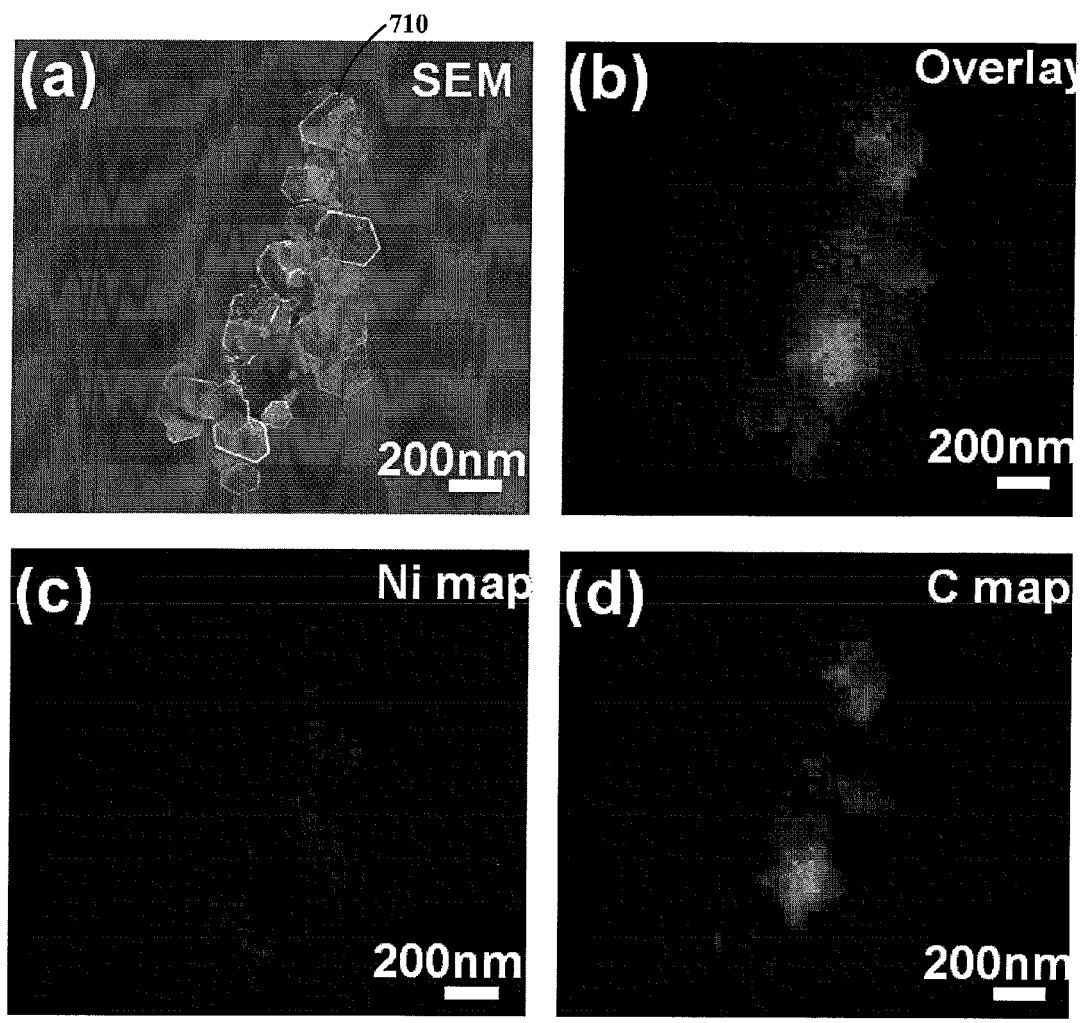

FIG. 7 shows a scanning auger electron spectroscopy characterization of hydrothermally-derived $Ni(OH)_2$/GS composite, consistent with another embodiment of the present disclosure. Referring to FIG. 7a, an SEM image of several pieces of $Ni(OH)_2$/GS is shown, with graphene sheet 710 labeled by way of example. FIGS. 7c-7d show auger mapping of the structure of FIG. 7a for Ni (blue signal) and C (green signal) elements as respectively shown in FIGS. 7c (Ni) and 7d (C).

Figure 8:
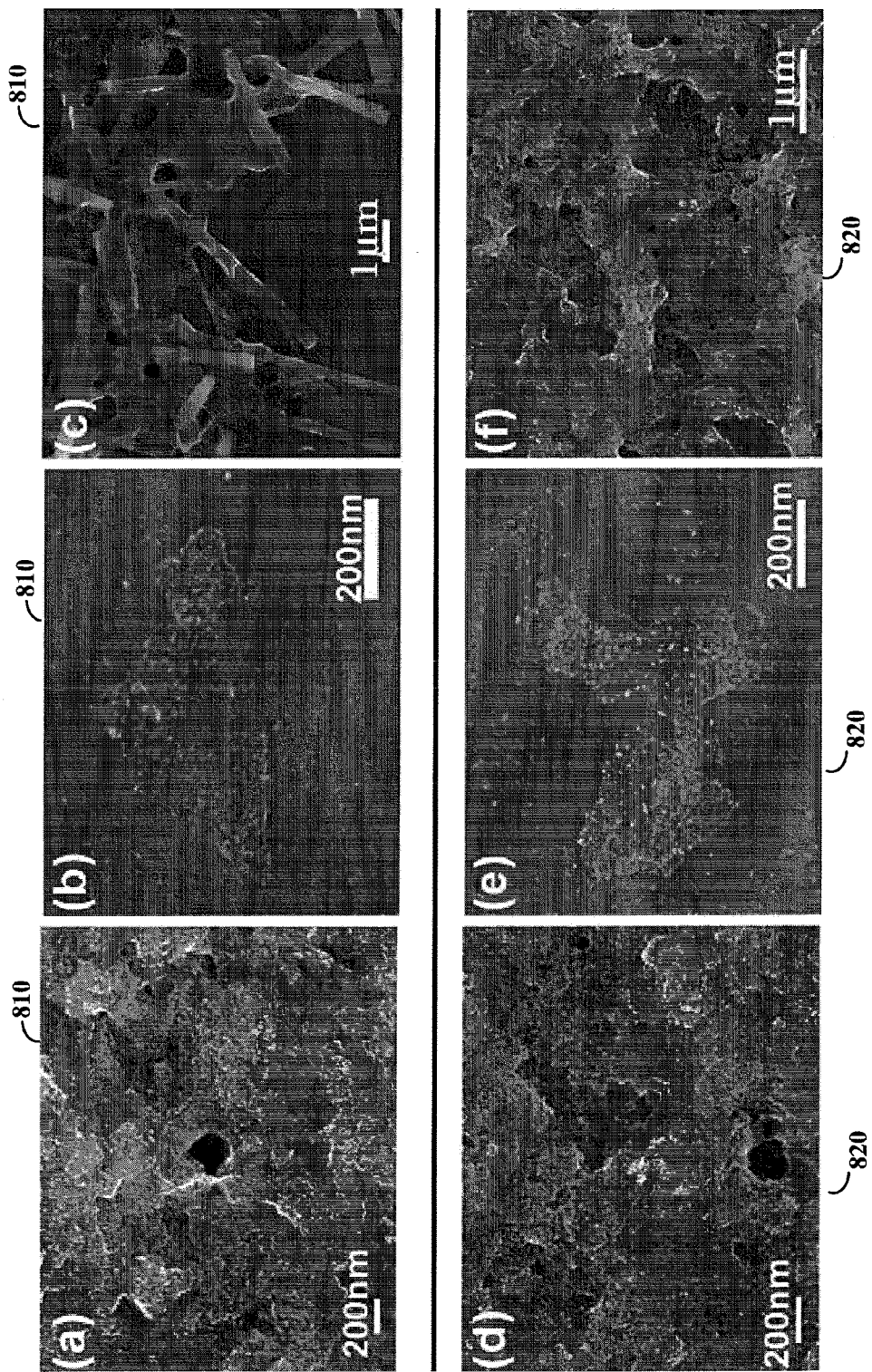

FIG. 8 shows SEM characterization of GS/$Fe_2O_3$ (810) and GO/$Fe_2O_3$ (820) composites, consistent with alternative embodiments of the present disclosure. Specifically, FIGS. 8a-8b depict low and high magnification SEM images of as-made GS/$Fe_2O_3$ composite 810 after first step of reaction at 80° C., and FIG. 8c shows an SEM image of this composite after the second-step hydrothermal reaction at 120° C. FIGS. 8d-8e show low and high magnification images of as-made GO/$Fe_2O_3$ 820 after first step of reaction at 80° C., and FIG. 8f shows an SEM image of the aforementioned composite after the second-step hydrothermal reaction at 120° C. After the first step of reaction, both the GS and GO were densely coated with small nanoparticles, showing the same morphology. However, after a second-step hydrothermal transformation reaction as discussed above, the small particles on GS transformed into nanorods on GS, while the coating on GO remained as small particles. As consistent with the above-discussed observation/discovery, controlling the oxygen content of the graphene sheets facilitates nanorod growth (e.g., single-crystal), whereas more heavily oxidized graphene (e.g., greater than 10% oxygen) limits such growth.

Figure 9:
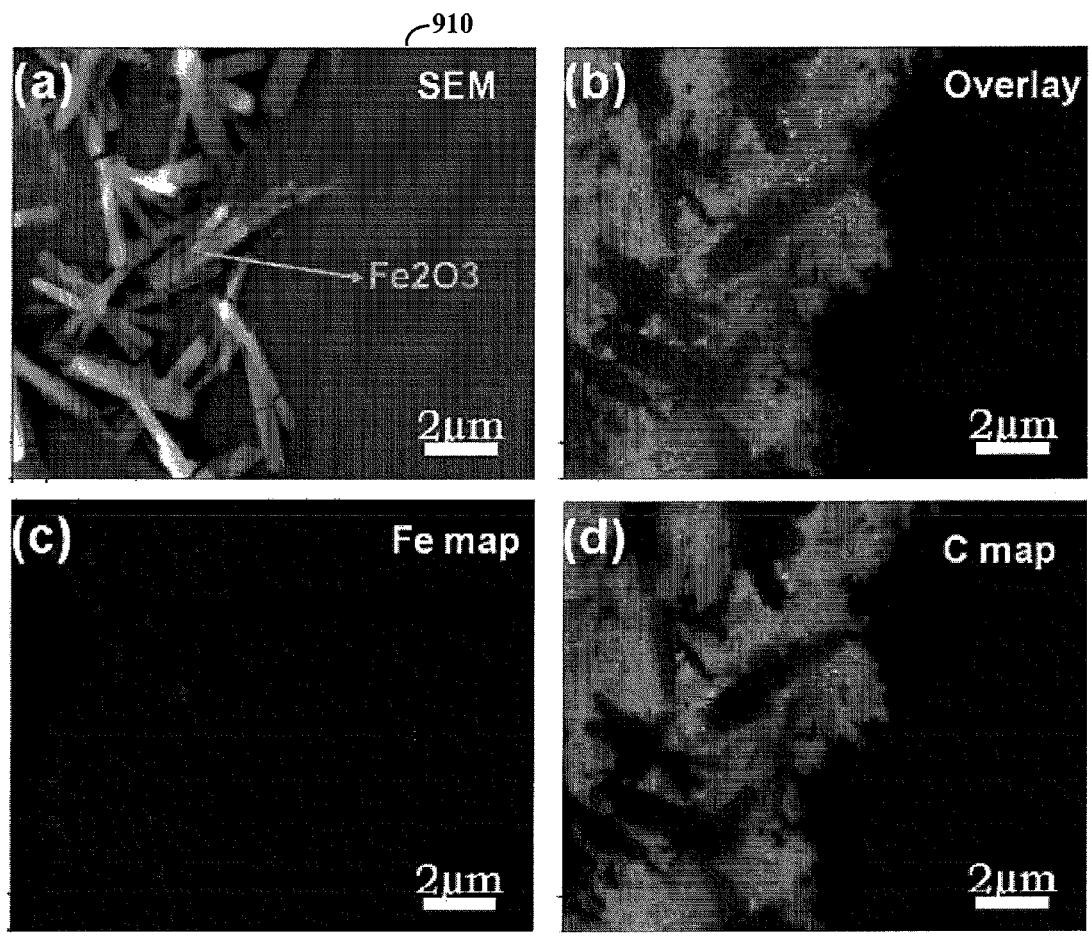

FIG. 9 shows a scanning auger electron spectroscopy characterization of a hydrothermally-derived $Fe_2O_3$/GS composite 910, consistent with a further embodiment of the present disclosure. FIG. 9a shows an SEM image of $Fe_2O_3$/GS, and FIGS. 9c-9d further depict auger mapping of the structure of FIG. 9a respectively for Fe (FIG. 9c) and C (FIG. 9d). FIG. 9b depicts an overlay of Fe and C as respectively shown in FIGS. 9c-9d.

Figure 10:
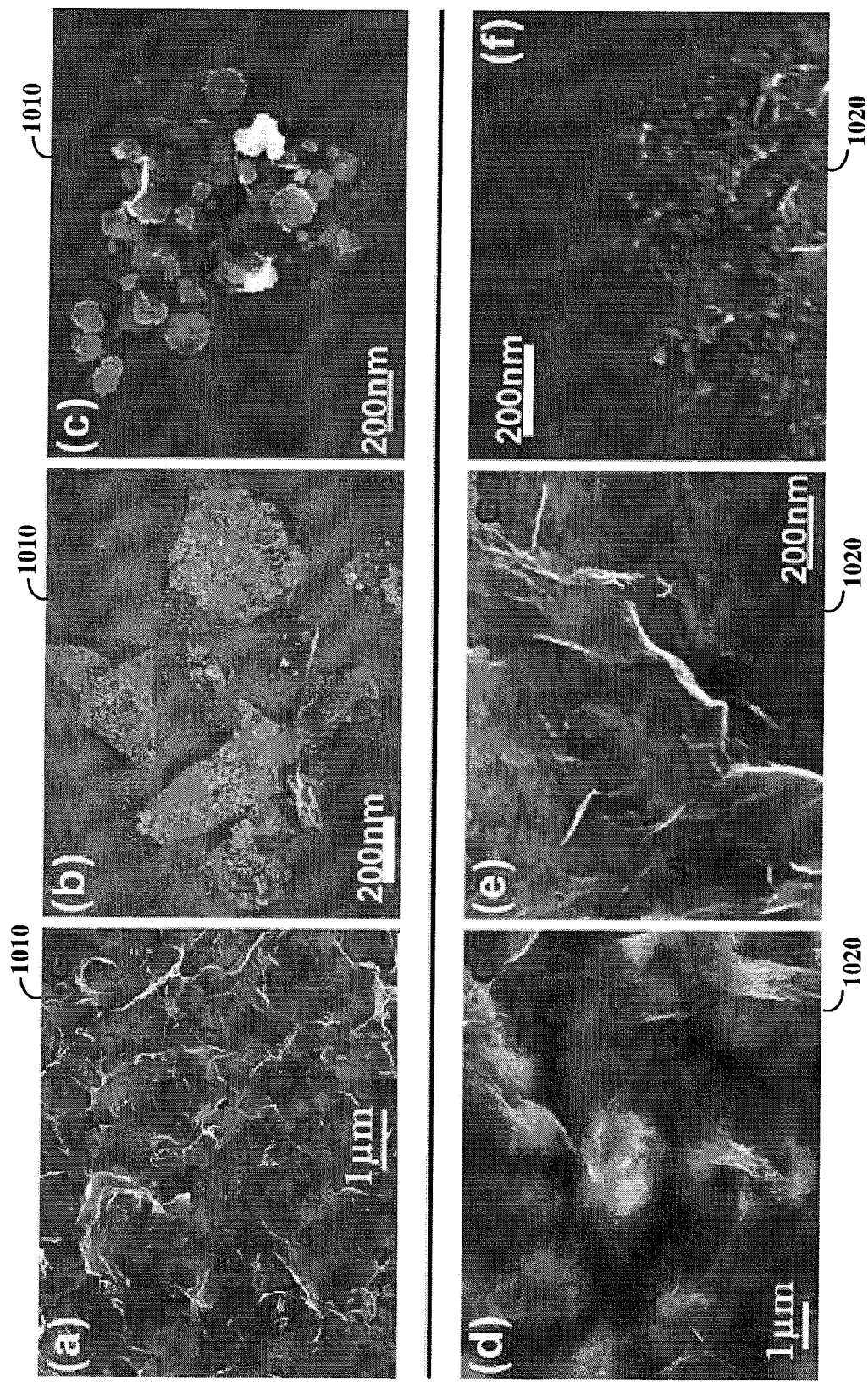

FIG. 10 shows SEM characterization of GS/$Co(OH)_2$ (1010) and GO/$Co(OH)_2$ (1020) composites, consistent with other embodiments of the present disclosure (XRD data not shown). FIGS. 10a-10b depict low and high magnification SEM images of as-made GS/$Co(OH)_2$ composite 1010 after a first step of reaction at 50° C., and FIG. 10c shows an SEM image of this composite after a second-step hydrothermal reaction at 80° C. FIGS. 10d-10e show low and high magnification images of as-made GO/$Co(OH)_2$ 1020 after the first step of reaction at 50° C., and FIG. 10f shows an SEM image of the aforementioned composite after the second-step hydrothermal reaction at 80° C. After the first step of reaction, both the GS and GO were uniformly coated with small nanoparticles, showing the same morphology. However, after the second-step hydrothermal transformation reaction as discussed above, the small particles on GS formed nanoplates with some of them showing hexagonal shapes, while the coating on GO remained as small particles with irregular shapes.

Figure 11:
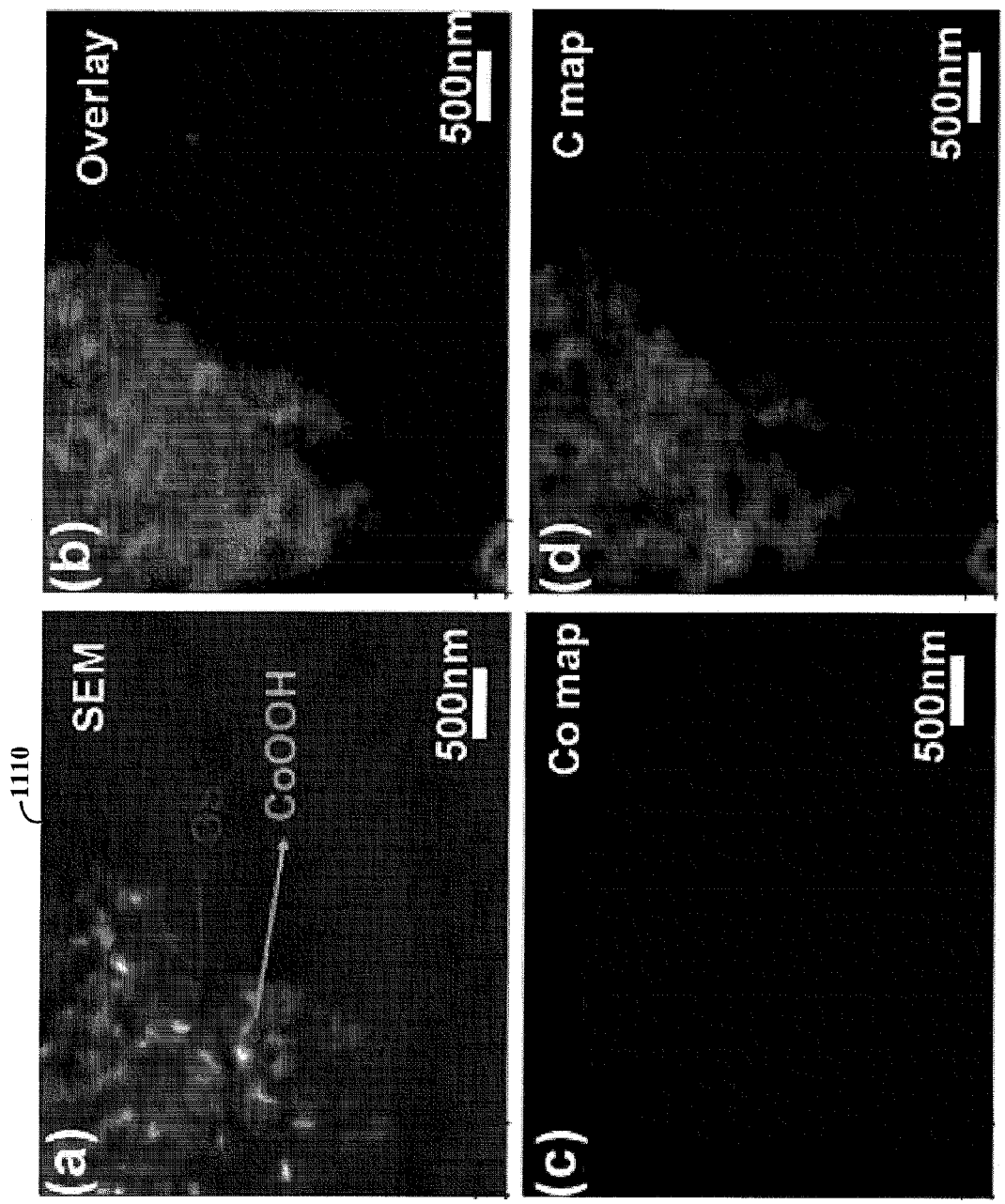

FIG. 11 shows a scanning auger electron spectroscopy characterization of a hydrothermally-derived CoO(OH)/GS composite, consistent with another embodiment of the present disclosure. FIG. 11a shows an SEM image of CoO (OH)/GS 1110. FIGS. 11c-11d further depict auger mapping of the structure of FIG. 11a respectively for Co (FIG. 11c) and C (FIG. 11d). FIG. 11b depicts an overlay of FIGS. 11c-11d.

Figure 12:
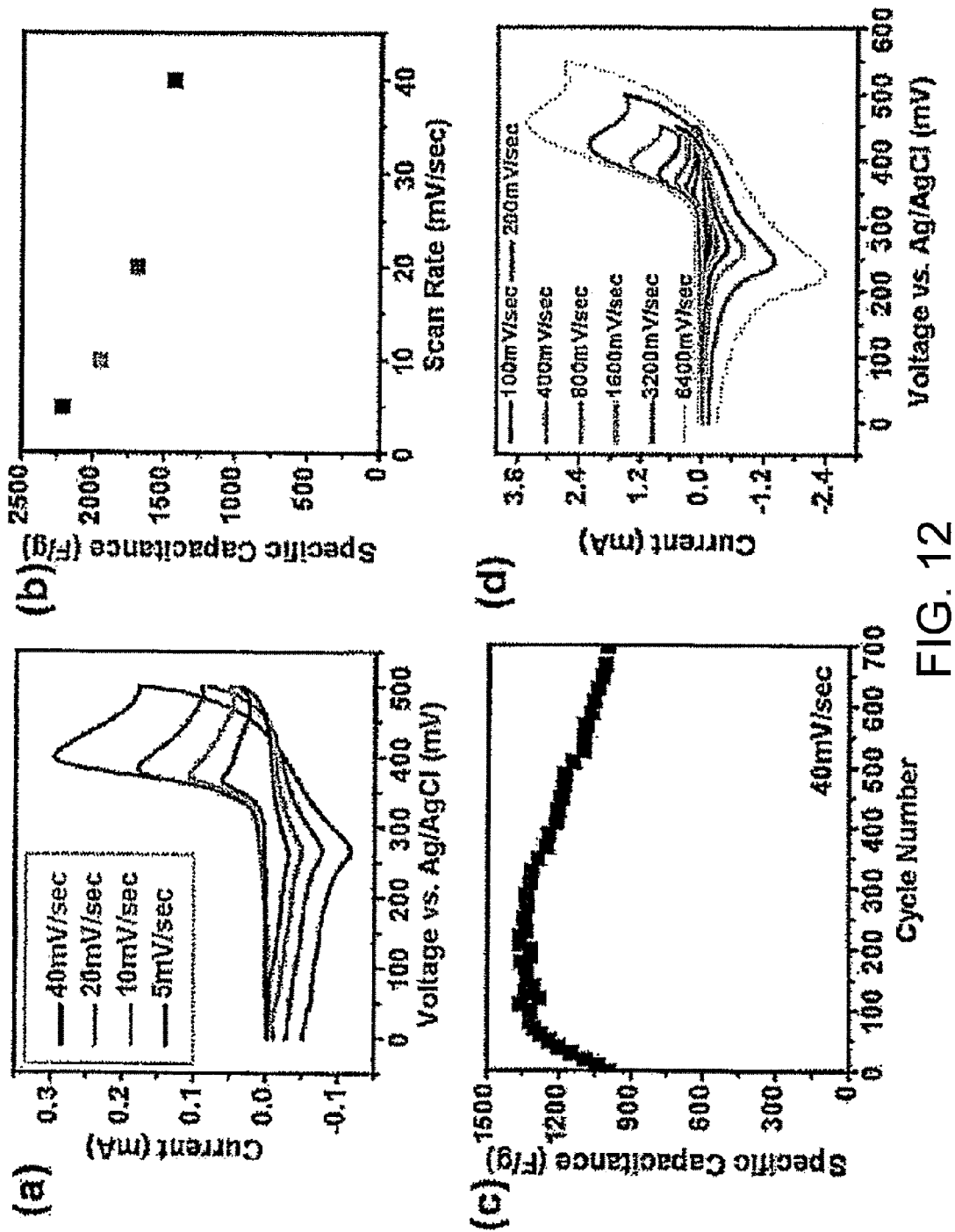

FIG. 12 depicts plots showing electrochemical characterization of $Ni(OH)_2$ nanoplates/GS composite with ~1:1 C/Ni (OH)$_2$ weight ratio, according to further embodiments of the present disclosure. Consistent with one or more detailed/experimental embodiments, the sample used in FIG. 12 has ~50% of GS by weight, and is achieved by increasing the concentration of GS during the synthesis. FIG. 12a shows CV curves of $Ni(OH)_2$ nanoplates/composite at various scan rates, whereas FIG. 12b shows the average specific capacitance of Ni(OH)$_2$ nanoplates grown on GS at various scan rates. FIG. 12c graphs average specific capacitance calculated from CV curves versus cycle number of Ni(OH)$_2$ nanoplates grown on GS at a scan rate of 40 mV/sec. FIG. 12d further shows the CV curves of the Ni(OH)$_2$ nanoplates/composite at ultrafast scan rates up to 6.4V/s.

Figure 13:
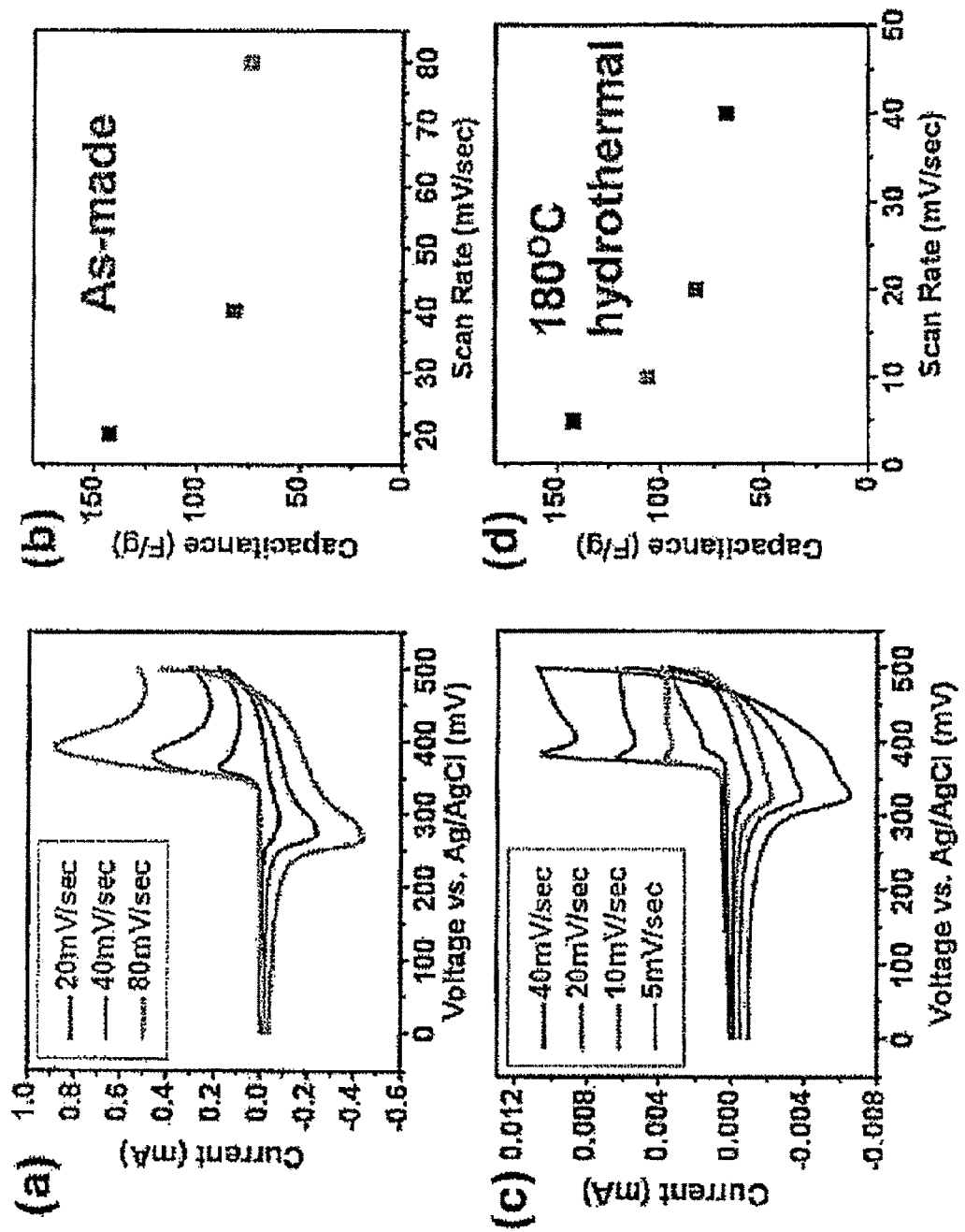

FIG. 13 depicts CV curves of hydrothermally-derived GO/Ni(OH)$_2$ composites at various scan rates, according to another embodiment of the present disclosure. FIG. 13a shows the first-step reaction, and FIG. 13c shows the second-step reaction of the of hydrothermally-derived GO/Ni(OH)$_2$ composites. Average specific capacitance of as-made, and hydrothermally-derived GO/Ni(OH)$_2$ composites, are respectively shown in FIG. 13b and FIG. 13d. The average specific capacitance values of the GO/Ni(OH)$_2$ composites were more than 10 times lower than the GS/Ni(OH)$_2$ composites due to the insulating nature of GO (more than 100 times less conducting than GS).

Figure 14:
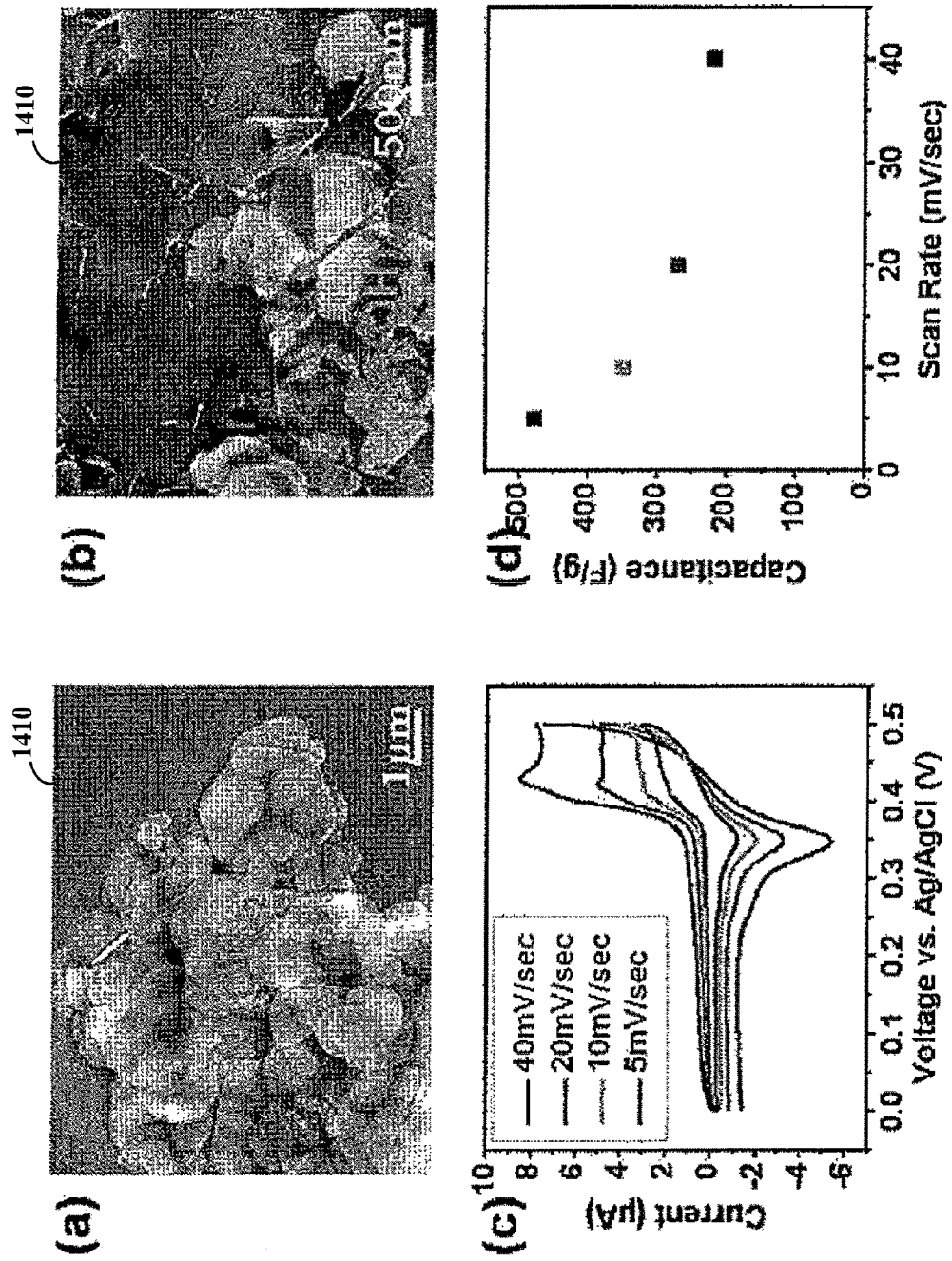

FIG. 14 shows SEM images and other graphs depicting a composite 1410 of Ni(OH)$_2$ nanoplates mixed with GS, according to other embodiments of the present disclosure. FIG. 14a shows an SEM image of hydrothermally derived Ni(OH)$_2$ nanoplates, and their simple mixture with GS (the same Ni/C ratio as GS/Ni(OH)$_2$) as shown in FIG. 14b. FIGS. 14c and 14d respectively show the CV curves and the average specific capacitance of the simple mixture at various scan rates. The Ni(OH)$_2$ nanoplates are made by hydrolysis of aqueous Ni(Ac)$_2$ solution at 180° C. hydrothermal conditions. The Ni(OH)$_2$ nanoplates are mixed with GS/DMF suspension by 3 min. of bath sonication. The mixture is transferred to water and deposited on substrates for SEM and CV characterization. In detailed/experimental embodiments consistent herewith, the average specific capacitance values were much lower than the GS/nickel composites due to the phase separation and poor contact between individual Ni(OH)$_2$ nanoplates and GS. In FIG. 14b, phase separation of the Ni(OH)$_2$ nanoplates and GS is shown.

Figure 15:
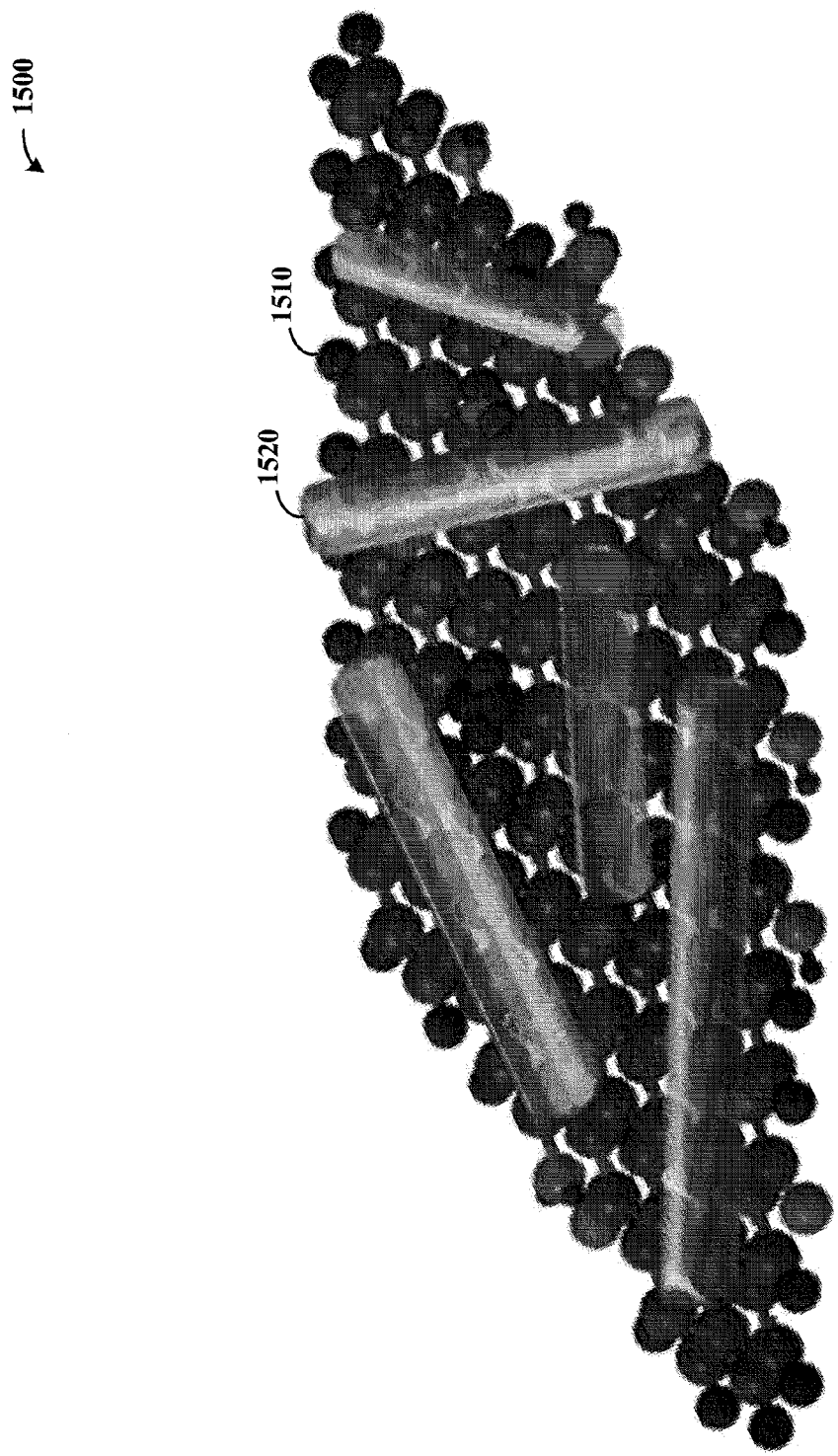
FIG. 15 shows a graphene-based electrode with nanorods grown thereupon, in accordance with one or more example embodiments.

FIG. 15 shows a graphene-based electrode 1500, in accordance with one or more example embodiments. The electrode 1500 includes a graphene-based sheet 1510 with nanorods, including nanorod 1520, thereupon. The nanorods can be used to facilitate interaction of the electrode in connection with various applications, such as those described herein with regard to supercapacitors and batteries.

Figure 16:
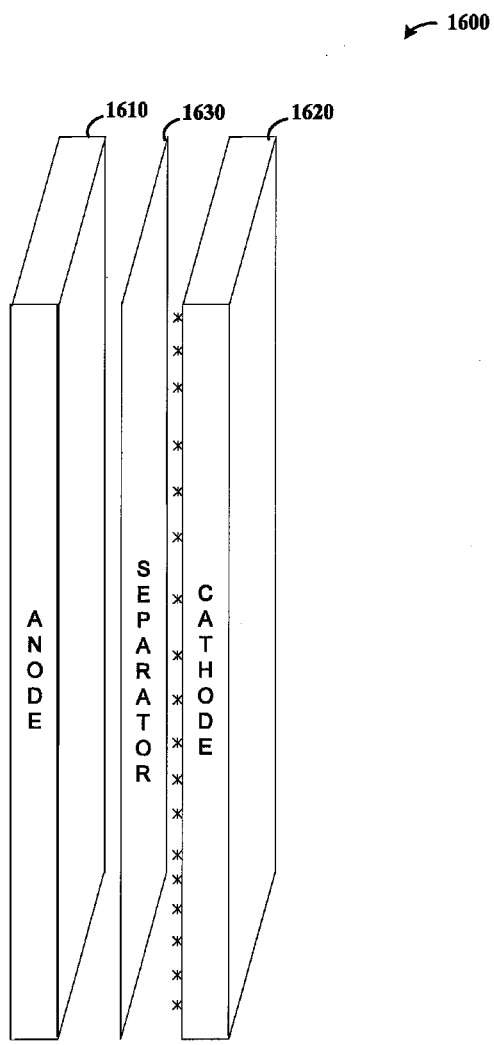
FIG. 16 shows a supercapacitor, in accordance with one or more example embodiments.

FIG. 16 shows a supercapacitor 1600, in accordance with one or more example embodiments (e.g., with "*" to depict single-crystal/GS hybrid). The supercapacitor 1600 includes an anode 1610 and cathode 1620 separated by a separator 1630. One or both of the anode and cathode 1610 and 1620 include a graphene sheet, with a single-crystalline material grown thereupon. For example, in one embodiment the anode 1610 includes a graphene sheet with Ni(OH)$_2$. In some embodiments, the cathode 1620 includes RuO$_2$ grown on a graphene sheet. Depending upon the application, the supercapacitor 1600 may be implemented as an asymmetric capacitor, or as an electric double-layer capacitor. In addition, while shown spaced for clarity, the anode 1610, cathode 1620 and separator 1630 can be stacked on one another.

Figure 17:
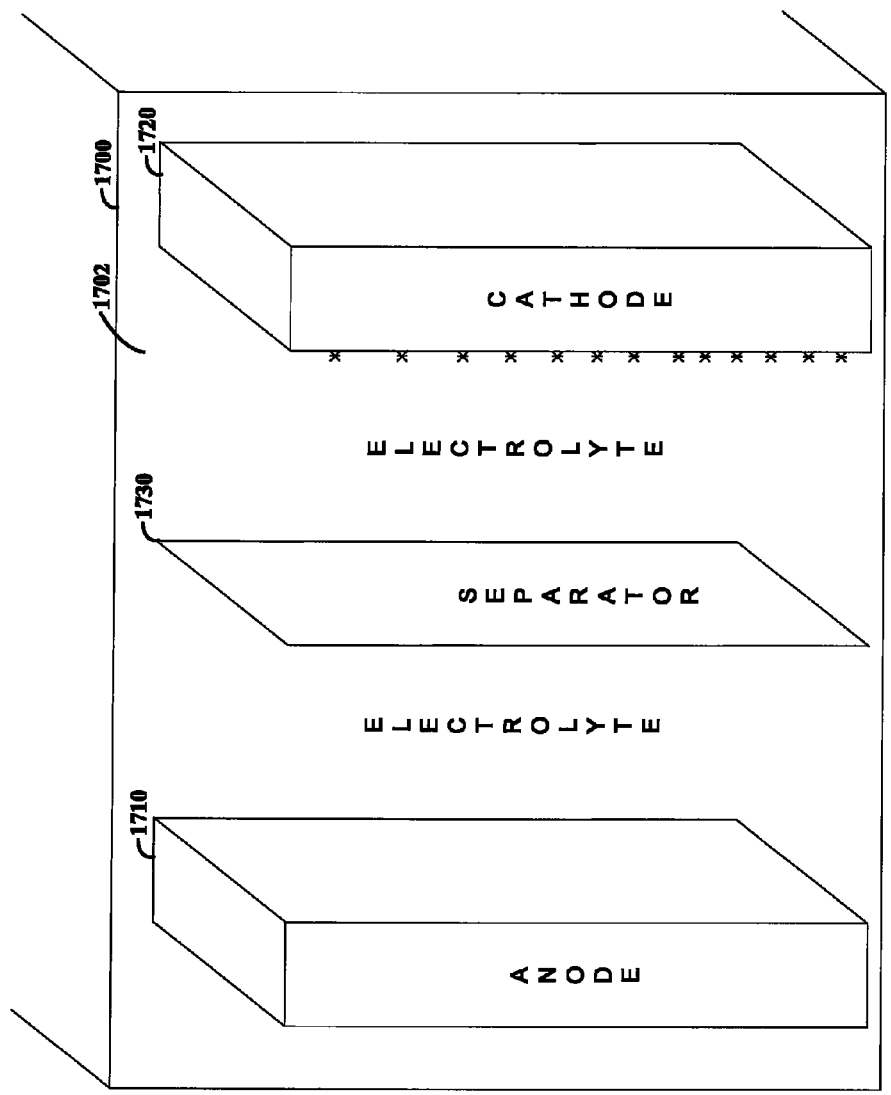
FIG. 17 shows a lithium-ion battery, in accordance with one or more example embodiments.

FIG. 17 shows a lithium-based battery 1700, in accordance with one or more example embodiments. The battery 1700 includes an anode 1710 and cathode 1720 with a separator 1730 therebetween. The battery 1700 also includes electrolyte material 1702 between the anode and cathode, with at least one of the anode and cathode being implemented with a graphene-based material. For instance, one embodiment is directed to implementation of the battery 1700 with the anode 1710 including a graphene sheet with Mn$_3$O$_4$ grown thereupon, as described herein. Other embodiments are directed to LiMn1-xFexPO$_4$ Nanorods grown on graphene sheets as the cathode 1720 (e.g., with Lithium foil as the anode 1710). Still other embodiments are directed to lithium-sulfur batteries, with the cathode 1720 implemented with porous graphene-based sheets having sulfur impregnated in the pores, the sulfur-impregnated pores trapping polysulfides during charging/discharging.

Figure 18:
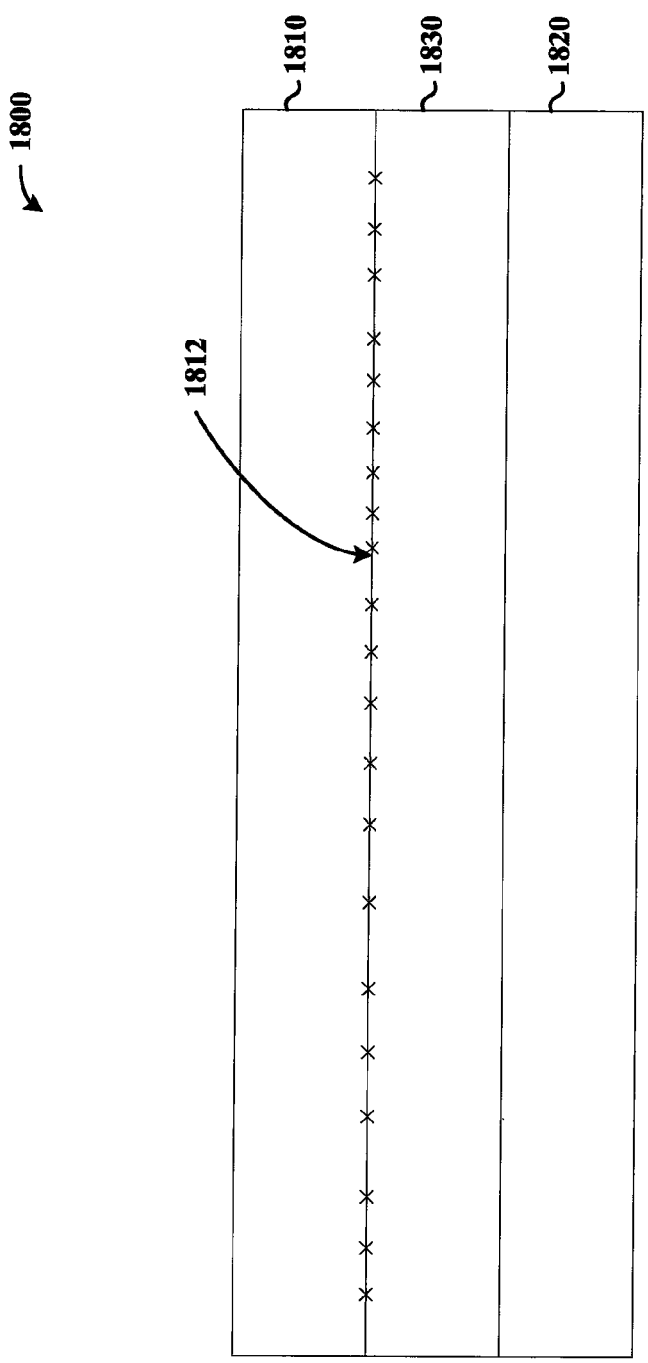
FIG. 18 shows a cross-sectional view of an air electrode, in accordance with one or more example embodiments.

FIG. 18 shows a cross-sectional view of an air electrode device 1800, in accordance with one or more example embodiments. The air electrode device 1800 includes a graphene-based electrode 1810 with a single-crystal type material grown at a surface (1812) thereof. A counter electrode 1820 is separated from the graphene-based electrode 1810 by an electrolyte material 1830. The single-crystal material may include, for example, a catalyst structure that facilitates an interaction for charging and/or discharging. For instance, the air electrode device 1800 may be used in a battery or fuel cell, with the graphene-based electrode 1810 used as a cathode and interacting with air to generate charge carriers that are transported via the electrolyte 1830. In one such embodiment, Co$_3$O$_4$ is grown on a graphene sheet with the electrode 1810, and configured and arranged to catalyze at least one of an oxygen reduction reaction (ORR) and an oxygen evolution reaction (OER). Other embodiments are directed to materials such as Co$_{1-x}$S, Mn$_2$CO$_4$, an Fe/Mn$_2$CO$_4$ combination, Co$_2$MnO$_4$, and MnO$_x$ implemented with graphene as the electrode 1810.

Aspects of the disclosure are directed to nanocrystals on graphene used in connection with single-atom thick two-dimensional conductors implemented to grow energy storage materials for high energy and power density devices. Examples of such energy storage materials and hybrid graphene materials are discussed above, with examples of such energy/power density devices including supercapacitors and batteries.

Other aspects are directed to a two-step method for growing nanocrystals with well-defined nanoplate or nanorod morphologies on weakly interacting and highly conducting graphene surfaces. The morphology of the nanocrystals formed on graphene is tailored by the degree of oxidation of graphene and the reaction temperature, and the method is applicable to synthesizing a wide range of functional nanomaterials.

In some embodiments, a graphene sheet (GS) with low degree of oxidation is made by an exfoliation-reintercalation-expansion method, and a graphene oxide sheet (GO) was produced by a modified Hummer method (FIG. 1). In certain detailed/experimental embodiments consistent herewith, the resistivity of GS was measured to be only several times higher than pristine graphene, but ~100 times lower than reduced GO. The oxygen content in GS (~5%) was much lower than in GO (~20%) as measured by Auger spectroscopy and X-ray photoelectron spectroscopy (XPS).

In various embodiments, the oxygen content is tuned, or set, between these levels to achieve a desirable foundation upon which to form nanocrystals, nanorods, nanoplates or other related materials. In this context and in accordance with various example embodiments, a low-oxide graphene sheet refers to a sheet having an oxidation level that is below GO (~20%) as discussed above. In some embodiments, the sheet exhibits an oxidation level that is below about 10% oxidation, and in other embodiments, the sheet exhibits an oxidation level that is at or below ~5% oxidation. In connection with these and related detailed/experimental embodiments, it has been discovered that tuning the oxidation accordingly sets characteristics of the nanocrystals, nanorods or other materials formed (e.g., grown) thereupon. Such tuning may, for example, be carried out by controlling one or more growth characteristics. The resulting structure, which may be referred to as a hybrid structure (e.g., via interaction between the graphene sheet and nanocrystal materials), exhibits characteristics that can be tailored for particular applications such as battery applications.

In the first step of $Ni(OH)_2$ growth on graphene, precursor materials are deposited in the form of small nanoparticles uniformly onto GS or GO by hydrolysis of $Ni(CH_3COO)_2$, at 80° C. in a 10:1 N,N-dimethylformamide (DMF)/water mixture. In connection with various detailed/experimental embodiments, it has been discovered that the 10:1 DMF/$H_2O$ ratio can be important to afford good dispersion of graphene and slow rate of hydrolysis that led to selective and uniform coating of nickel hydroxide on graphene, with little particle growth in free solution. After the first step, dense and uniform $Ni(OH)_2 \cdot 0.75H_2O$ nanoparticles (~10-2020 nm in diameter) are formed on both GS and GO, revealed by scanning electron microscopy (SEM) (FIG. 5) and X-ray diffraction (XRD) (FIG. 6a, 6c). The percentage of mass of $Ni(OH)_2 \cdot 0.75H_2O$ was ~87% in the graphene composite. When water is used as the sole solvent, appreciable $Ni(OH)_2 \cdot 0.75H_2O$ particle growth is achieved in free solution instead of on GS due to fast hydrolysis rate.

In the second step, the first step product, i.e., $Ni(OH)_2 \cdot 0.75H_2O$ coated GS is hydrothermally treated at 180° C. in water (see Methods Summary and Supplementary Information). It has been observed/discovered that the coating material evolved from dense small particles into hexagonal nanoplates selectively attached to GS (FIG. 1 top panel and FIG. 2). The side length of the nanoplates was several hundred nanometers with thickness <~10 nm (FIG. 2a-c, 2e). XRD of a thick layer of packed nanoplates/GS suggested crystalline β-$Ni(OH)_2$ formed on graphene (FIG. 2f). Transmission electron microscopy (TEM) (FIG. 2c, 2d) clearly revealed the (100) and (010) lattice fringes in the plane of single-crystalline hexagonal $Ni(OH)_2$ nanoplate on GS. The corresponding fast Fourier transform (FFT, FIG. 2d inset) of the high resolution TEM image was consistent with hexagonal lattice perpendicular to the (001) zone axis, suggesting $Ni(OH)_2$ nanoplates attached to GS at their (001) planes. In a film of the packed $Ni(OH)_2$/GS plates for XRD experiments and later electrochemical measurements, a large fraction of the plates were packed in parallel to each other and to the substrate, giving an enhanced (001) diffraction peak in the XRD spectrum (FIG. 2f). Scanning Auger electron spectroscopy (SAES) elemental imaging of Ni and C elements in $Ni(OH)_2$/GS composite further confirmed attachment of $Ni(OH)_2$ nanoplates on GS (FIG. 7).

The same $Ni(OH)_2 \cdot 0.75H_2O$ coating obtained on GO led to small nanoparticles of β-$Ni(OH)_2$ after the second step of hydrothermal treatment at 180° C. (FIG. 1 lower panel, FIG. 3 and FIG. 6d), without producing large single-crystalline hexagonal nanoplates as in the GS case. In connection with these results, it has been discovered that the size, morphology and crystallinity of nanocrystals formed on graphene are dependent on the degrees of oxidation of the underlying graphene substrates. Accordingly, various embodiments are directed to setting one or more of the size, morphology and crystallinity of nanocrystals by controlling the degree of oxidation.

GS with fewer functional groups and defects exhibit weaker chemical interactions with coating species on the surface. During the 180° C. hydrothermal reaction, the small coating particles on GS diffused across the 'slippery' graphitic lattice and recrystallized into single crystalline hexagonal nanoplates on the GS. On GO, however, due to higher density of oxygen functional groups including carboxylic, hydroxyl, and epoxy groups, the GO surface interacted strongly with the coated species, providing pinning forces to the small particles to hinder diffusion and recrystallization. As a result, most of the $Ni(OH)_2 \cdot 0.75H_2O$ particles coated on GO by the first step reaction remained pinned at the original positions after the second step hydrothermal treatment at higher temperature. In the case of $Ni(OH)_2$/GS, one or both of chemisorption and van der Waals interactions are used with respect to interactions between $Ni(OH)_2$ nanoplates and graphene, at oxygen-containing defect sites and pristine regions of the GS respectively.

For general information regarding graphene sheets, and for specific information regarding various approaches to the fabrication of graphene sheets and/or other aspects that may relate to one or more example, embodiments, reference may be made to Appendix A in the above-cited (and incorporated) patent document (Ser. No. 61/444,480).

Various embodiments are directed to an approach for controlling nanocrystal morphology by two-step synthesis on graphene with different degrees of oxidation (FIGS. 8-11). CoO(OH) and $Fe_2O_3$ nanocrystals are produced with regular nanoplate or nanorod morphologies on OS, using $Co(CH_3COO)_2$, and $Fe(CH_3COO)_2$, as precursors (FIGS. 8c and 10c) respectively. On GO, small irregularly-shaped nanoparticles are formed (FIGS. 8f and 10f). These results exemplify the use of graphene with various degrees of oxidation to control/set the growth of nanocrystals with various sizes and morphologies.

Using these approaches, each $Ni(OH)_2$ nanoplate is formed in intimate contact with highly conducting GS, to facilitate fast electron transport between nanoplates and the attached graphene sheets for electrochemical applications. A thick film of $Ni(OH)_2$/GS can be formed on a platinum working electrode by packing the nanoplate/GS composites by simple drop-drying. The stacked $Ni(OH)_2$ nanoplates/GS building blocks are electrically interconnected through the GS attached to each $Ni(OH)_2$ nanoplate (FIG. 4a). Electrochemical performance composites/hybrid materials in accordance with various embodiments are characterized as follows (e.g., as tested with a three-electrode beaker cell with saturated Ag/AgCl as the reference electrode and 1M aqueous KOH solution as electrolyte). Cyclic voltammetry (CV) shows redox current peaks corresponding to the reversible reactions of Ni(II)←→Ni(III) (FIG. 4b), and the capacitance of the $Ni(OH)_2$ nanoplates on GS is shown/calculated for different scan rates (FIG. 4c). The highly crystalline hydrothermally derived hexagonal $Ni(OH)_2$ nanoplates on GS exhibit excellent characteristics for high performance redox electrochemical pseudo-capacitors. The average stable-specific capacitance can be up to and/or exceeding ~1230 F/g (based on weight of $Ni(OH)_2$ ~820 F/g based on total sample weight) after 200 cycles at a high scan rate of 40 mV/s (FIG. 4d), ~10 times higher than electrochemical double-layer super-capacitors based on graphene and carbon nanotubes. This is also a high stable capacitance for pseudo-capacitive nanomaterials including $Ni(OH)_2$, $RuO_2$ and $MnO_2$ with capacitances typically in the range of ~200-1000 F/g at slower scan rates (<10 mV/s, see Table 1 below).

TABLE 1

Comparison of Ni(OH)2 nanoplates on GS with other super-capacitor materials.

| Nanomaterials | Stable capacitance (F/g) | Cyclic voltammetry scan rate (mV/sec) | Galvanostatic charge/discharge current (A/g) |
|---|---|---|---|
| β-Ni(OH)$_2$ hexagonal nanoplates on GS (this work) | ~1230 | 40 | |
| β-Ni(OH)$_2$ hexagonal nanoplates on GS (this work) | ~1000 | | 50 |
| α-Ni(OH)$_2$ nanoparticles on nickel foam (Ref. 1) | ~1600 | | 4 |
| α-Ni(OH)$_2$ nanoparticles on nickel foam (Ref. 1) | ~280 | | 16 |
| Honeycomb-like β-Ni(OH)$_2$ film (Ref. 2) | ~398 | 5 | |
| 1D nano-MnO$_2$ (Ref. 3) | ~234 | 5 | |
| 1D nano-MnO$_2$ (Ref. 3) | ~210 | | 0.3 |
| RuO2 nanoparticles by electrophoretic deposition (Ref. 4) | ~720 | 2 | |
| MnO$_2$/MWNT (Ref. 5) | ~650 | 2 | |
| RuO$_2$/MWNT (Ref. 6) | ~147 | 2 | |
| RuO$_2$/carbon nanofiber (Ref. 7) | ~1017 | 10 | |
| Reduced GO (Ref. 8) | ~180 | | 0.5 |
| Reduced GO (Ref. 9) | ~107 | 40 | |
| SWNT network (Ref. 10) | ~35 | | 30 |
| Packed SWNT(Ref. 11) | ~10 | | 12 |

Constant-current galvanostatic charge/discharge experiments reveal that even at an ultra-high discharge current density of ~50 A/g, material in accordance with one or more embodiments described herein, can be used to achieve a high capacitance of ~1000 F/g (FIG. 4e, 4f). Hexagonal Ni(OH)$_2$ nanoplates grown on GS showed higher specific capacitance at higher charge/discharge rates than pseudo-capacitive nanomaterials of Ni(OH)$_2$, Mn0225, MnO$_2$, RuO$_2$ and their composites with carbon nanotubes or nanofibers (see, Table 1 above). A capacity of 156 mAh/g (based on weight of Ni(OH)$_2$, ~104 mAh/g based on total sample weight) was achieved at the discharge rate of 172 C. Our Ni(OH)$_2$ nanoplates/GS composite could be fully charged or discharged at high capacity in ~11 seconds (FIG. 40, comparable to ultrafast-rate performance of nano-LiFePO$_4$ reported recently. It is important to note that the performance of pseudo-capacitors can be further tailored (e.g., optimized for an implementation), such as by increasing the GS to Ni(OH)$_2$ weight ratio, to obtain specific capacitance up to ~2200 F/g at a scan rate of 5 mV/s and capacitance >1000 F/g at 40 mV/s scan-rate even after 700 cycles (FIG. 12a-c). At an ultra-high scan rate of 6.4V/s, clear redox peaks were still observed in CV curves (FIG. 12d), demonstrating remarkable rate capability of the Ni(OH)$_2$/graphene material.

In some embodiments, single-crystalline Ni(OH)$_2$ hexagonal nanoplates on GS are used as building blocks for high capacity and ultrafast energy storage and releasing, with highly insulating Ni(OH)$_2$ nanoplates directly grown and anchored on highly conducting graphene sheets. This affords facile electron transport between individual nanoplates and the GS, which can be used to achieve both high capacity and excellent high power and rate capability of the Ni(OH)$_2$/GS material. With little dead volume, all Ni(OH)$_2$ nanoplates in the macroscopic ensemble are electrochemically active and conduct to the outside through the attached GS in an interconnected graphene network. Rapid charge transport through the sample supports fast redox reactions at high scan rates and charge/discharge currents. Graphene sheets with low oxidation can be used to impart excellent electrical conductivity to composites with insulating nanomaterials.

In control test-type embodiments, Ni(OH)$_2$ nanoplates (FIG. 14a) are synthesized and mixed with GS. The simple physical mixture exhibited low capacitance (FIG. 14c, 14d) due to poor contact between the Ni(OH)$_2$ nanoplates and GS. Phase separation (FIG. 14b) was in fact observed between the Ni(OH)$_2$ nanoplates and GS in the mixture. Various nanoplates/GS approaches can be used as an alternative to physically mixing nano- or micro-particles with carbon nanotubes, using the two-dimensional nature of graphene affording optimal planar-contact with electrochemically active nanomaterials instead of line-contact in the nanotube case. Moreover, the morphology of large thin (<10 nm) single-crystalline nanoplates of Ni(OH)$_2$ on GS as formed in accordance with one or more embodiments can be used to achieve effective charging and discharging through the nanoplate thickness during fast cycling.

Various embodiments are directed to a multi-step (e.g., two-step) method as discussed herein, to grow nanocrystals with well-defined nanoplate or nanorod morphologies on weakly interacting and highly conducting graphene surfaces. The morphology of the nanocrystals formed on graphene can be tailored by the oxidation degree of graphene, which can be extended to synthesize a wide range of nanomaterials for various applications, such as battery applications, supercapacitor applications and other circuit-based applications. The light weight, high surface area and high electrical conductivity of graphene facilitate its use as a substrate for materials growth for a wide range of high performance applications including electrocatalysis and energy storage and conversion.

In a method-based embodiment, a Ni(OH)$_2$/GS (GO) composite is synthesized, with 4 ml of GS (GO)/DMF suspension with a concentration of ~0.25 mg/ml graphene heated to 80° C., to which 0.4 ml of Ni(Ac)$_2$ aqueous solution with a concentration of 0.2M is added. The suspension is kept at 80° C. with stirring for 1 hour. For a second step reaction, the intermediate product is transferred to 10 ml of water and sealed in Teflon® lined stainless steel autoclaves for hydrothermal reaction at 180° C. for 10 hours. The composites are characterized by SEM (Raith 150), TEM (FEI Tecnai F20), XRD (PANalytical X'Pert), and SAES (PHI 700). For electrochemical measurement, the composites can be drop-dried onto platinum working electrode from water solution. CV and galvanostatic charge/discharge can be carried out on a BAS CV50W potentiostat and a CHI 660D electrochemistry station.

Various other example embodiments are directed to Fe-doped LiMnPO$_4$ (e.g., LiMn$_{0.75}$Fe$_{0.25}$PO$_4$) nanorods bonded on graphene sheets, to render nanorods with desirable/superior electrical conductivity. The nanorod morphology corresponds to materials grown on graphene relative to those grown in free solution, and facilitates fast lithium ion diffusion with the diffusion path of [010] crystallographic axis along the short radial direction (~20-30 nm) of the nanorods. In various embodiments, these structures are configured for ultrafast discharge within ~30-40 seconds without necessarily using high carbon content. The graphene sheets can be reduced from graphene and/or formed to a set degree of oxidation (e.g., as described in one or more of the Appendices in the above-referenced provisional patent applications), to achieve desired nanorod formation.

In accordance with one or more embodiments, a two-step approach is used to synthesize nanorods on reduced graphene oxide sheets that are stably suspended in solution. Fe-doped Mn$_3$O$_4$ nanoparticles are selectively grown onto graphene oxide by controlled hydrolysis. The oxide nanoparticle precursors are solvothermally reacted with lithium and phosphate ions, and transformed into $LiMn_xFe_{1-x}PO_4$ on the surface of reduced graphene oxide sheets. With a total content of 26 wt % conductive carbon, the resulting hybrid of nanorods and graphene exhibits high specific capacity and high power rate for cathode materials. Stable capacities of 132 mAh/g and 107 mAh/g can be obtained at high discharge rates of 20 C and 50 C, 85% and 70% of the capacity at C/2 (155 mAh/g) respectively. Some implementations are directed to using the electrode formed by the nanorod/graphene hybrid for lithium-ion batteries with high energy and high power densities. Some implementations are directed to the synthesis of $LiMn_{0.75}Fe_{0.25}PO_4$ nanorods, with a crystal shape and morphology for fast lithium ion diffusion along the radial [010] direction of the nanorods.

In one such two-step approach in which a solution phase reaction scheme for synthesizing $LiMn_{0.75}Fe_{0.25}PO_4$ nanorods on reduced graphene oxide is implemented, oxide nanoparticles are grown at 80° C. on mildly oxidized graphene oxide (mGO) stably suspended in a solution. The hydrolysis rate of $Mn(Ac)_2$ and $Fe(NO_3)_3$ is controlled by adjusting the H2O/N,N-dimethylformamide (DMF) solvent ratio and the reaction temperature afforded selective and uniform coating of ~10 nm nanoparticles of Fe-doped $Mn_3O_4$ on GO sheets without free growth of nanoparticles in solution. The mGO can be made by a modified Hummers method, with which a six times lower concentration of $KMnO_4$ oxidizer was used to afford milder oxidation of graphite.

A second step reaction transforms the Fe-doped $Mn_3O_4$ nanoparticles into $LiMn_{0.75}Fe_{0.25}PO_4$ nanorods, by reacting with LiOH and $H_3PO_4$ solvothermally at 180° C. Ascorbic acid (VC) is added to reduce Fe(III) to Fe(II), and reduce mGO as well. This afforded highly-conducting reduced graphene oxide sheets (rmGO) with the formation of $LiMn_{0.75}Fe_{0.25}PO_4$ nanorods atop. The electrical conductivity measured from pellets of $LiMn_{0.75}Fe_{0.25}PO_4$/rmGO hybrid can be achieved at about 0.1-1 S/cm, $10^{13}$-$10^{14}$ times higher than pure $LiMnPO_4$.

Various embodiments are directed to the formation of a hybrid battery material, using approaches such as discussed herein, to form a $LiMn_{0.75}Fe_{0.25}PO_4$ nanorod/rmGO hybrid material exhibiting intimate interaction between the nanorods and the underlying reduced graphene oxide sheets. The nanorod morphology and crystallographic orientation of the $LiMn_{0.75}Fe_{0.25}PO_4$ nanocrystals are set to facilitate the diffusion of lithium (or other) ions and related charge transport for rapid charging and discharging for the battery.

Other example embodiments are directed to an electrode having a graphene sheet and a plurality of nanorods including Fe-based material on the graphene sheet. In some implementations, the electrode is a battery cathode, the Fe-based material includes Fe-doped $LiMnPO_4$ bonded on the graphene sheet, and the graphene sheet and nanorods form a hybrid battery material configured for charging and discharging via the addition and discharge of lithium ions.

The nanorods can be formed in a variety of manners and arrangements. In some implementations, the nanorods are formed in a diffusion path in a [010] crystallographic axis in a radial direction of the nanorods. Such (e.g., single crystal) nanorods may also have a length that extends along a [001] crystallographic axis, and may have a length of between about 50 and 100 nanometers and a diameter of between about 20-30 nanometers. In some implementations, the nanorods are configured and arranged with an underlying graphene sheet to store and release energy via rapid lithium ion insertion and extraction along the diffusion path. Such nanorods may have an Mn/Fe ratio of about 3.

The graphene sheet can be implemented with the nanorods in a variety of manners. In some embodiments, the graphene sheet includes sufficient functional groups to nucleate and anchor oxide nanoparticles on the surface of the graphene sheet. In another embodiment, the graphene sheet includes at least one of carboxyl, hydroxyl and epoxide functional groups configured to nucleate and anchor oxide nanoparticles on the surface of the graphene sheet.

Other example embodiments are directed to methods of making electrodes. In one example embodiment, Fe-based material (e.g., Fe-doped $Mn_3O_4$) precursor nanoparticles are formed on a graphene sheet, and the nanoparticles are reacted with lithium and phosphate ions to form nanorods on the surface of the graphene sheet. The nanorods can be formed on the surface of the graphene sheet to interact with the sheet and form a hybrid material of a battery cathode. In some implementations, the precursor nanoparticles are Fe-doped $Mn_3O_4$ nanoparticles selectively grown on a graphene sheet, via controlled hydrolysis. In certain implementations, the nanorod/graphene sheet combination is annealed to form a hybrid nanorod-graphene material.

In some embodiments, the precursor nanoparticles are formed using a solution including $Mn(Ac)_2$ and $Fe(NO_3)_3$ by hydrolyzing the solution to selectively grow Fe-doped $Mn_3O_4$ nanoparticles on the graphene sheet. Reacting the nanoparticles with lithium and phosphate ions may include, for example, solvothermally reacting the nanoparticles with lithium and phosphate ions.

Where hydrolysis is implemented, the temperature and solvent concentration are set to facilitate the forming of the precursor nanoparticles to mitigate substantially all formation of the nanoparticles in solution with the solvent and promote the formation of the nanoparticles on the graphene sheet.

In a more particular embodiment, functional groups are formed on the graphene sheet, and which promote the adsorption of cations and nucleation of the nanoparticles. The nanoparticles are reacted with lithium and phosphate ions by forming $LiMn_xFe_{1-x}PO_4$ nanorods using aromatic regions of the sheet to promote the formation of nanocrystals.

The embodiments and specific applications discussed herein and in the above-referenced provisional patent applications (including the Appendices therein) may be implemented in connection with one or more of the aspects, embodiments and implementations described herein, as well as with those shown in the figures. One or more of the items depicted in the present disclosure and in the Appendices can also be implemented in a more separated or integrated manner, or removed and/or rendered as inoperable in certain cases, as is useful in accordance with particular applications. Moreover, for general information and for specifics regarding applications and implementations to which one or more embodiments of the present invention may be directed to and/or applicable, reference may be made to the references cited in the aforesaid Appendices and provisional patent applications, all of which are fully incorporated herein by reference. In view of the description herein, those skilled in the art will recognize that many changes may be made thereto without departing from the spirit and scope of the present invention.

What is claimed is:

1. A method of manufacturing an electrode, the method comprising:
   using precursor particles to form $Ni(OH)_2$, $Mn_3O_4$ or iron family element nanoparticles at respective locations on a low oxide graphene sheet; and
   diffusing and recrystallizing the nanoparticles to form a single-crystal structure on a surface of the graphene sheet.

2. The method of claim 1, wherein diffusing and recrystallizing the nanoparticles includes diffusing the nanoparticles across a graphitic lattice of the graphene sheet and recrystallizing the nanoparticles into single-crystalline structures.

3. The method of claim 1, wherein the precursor particles are composed of a material used to form the nanoparticles, and using precursor particles to form nanoparticles at respective locations on a graphene sheet includes pre-coating precursor particles on a graphene sheet having an oxygen content that is less than 10%.

4. The method of claim 1, wherein the precursor particles are composed of a material used to form the nanoparticles, and using precursor particles to form nanoparticles at respective locations on a graphene sheet includes pre-coating precursor particles on a graphene sheet having an oxygen content that is less than 5%.

5. The method of claim 1, further including controlling the oxidation of the graphene sheet to maintain the oxygen content to a value that is less than 10%.

6. The method of claim 1, further including uniformly pre-coating the precursor particles on a rolled graphene sheet.

7. The method of claim 1, further including uniformly pre-coating the precursor particles on a planar graphene sheet.

8. The method of claim 1, wherein diffusing and recrystallizing the nanoparticles includes diffusing the nanoparticles across a graphitic lattice of the graphene sheet and recrystallizing the nanoparticles into a plurality of single-crystalline nanoplates, further including stacking the plurality of single-crystalline nanoplates to form an electrochemical pseudo-capacitor electrode.

9. The method of claim 1, wherein diffusing and recrystallizing the nanoparticles includes hydrothermally treating the nanoparticles and forming at least one type of nanocrystals selected from the group consisting of hydroxide, oxide, sulfide and selenide nanocrystals, respectively of at least one of the group consisting of $Mn_3O_4$ nanoparticles and iron family elements selected from the group consisting of Ni, Co, Mn, Mo, Ru and Fe.

10. The method of claim 1, further including forming the graphene sheet to a degree of oxidation and controlling the reaction temperature of the recrystallizing of the nanoparticles, to control the morphology of the single-crystal structure to set capacitance and discharge current density values of the electrode.

11. The method of claim 1, wherein diffusing and recrystallizing the nanoparticles to form a single-crystal structure includes forming $Ni(OH)_2$ nanoplates attached to the graphene sheet at (001) crystallographic planes.

12. The method of claim 1, including providing the single-crystal structure as grown on the graphene sheet, with the graphene sheet and single-crystalline structure being configured and arranged as one electrode terminal.

13. The method of claim 12, wherein the single-crystal structure and graphene sheet are coupled to an electrode, and the single-crystal structure is configured and arranged to facilitate exchange of charge carriers with the electrode.

14. The method of claim 12, wherein the single-crystal structure includes at least one of $Mn_3O_4$ and iron family elements selected from the group consisting of Ni, Co, Mn, Mo, Ru and Fe.

15. The method of claim 12, further including a plurality of the graphene sheets with a single-crystal structure grown thereupon and stacked in layers that form an electrochemical pseudo-capacitor electrode.

16. The method of claim 12, wherein the single-crystal structure includes an $Ni(OH)_2$ nanoplate attached to the graphene sheet at (001) crystallographic planes.

17. The method of claim 12, further including providing:
   another electrode terminal, whereby said one electrode terminal and the other electrode terminal are first and second electrodes respectively; and
   a separator between the first and second electrodes and configured and arranged to facilitate ion exchange between the first and second electrodes.

18. The method of claim 17, wherein the single-crystal structure is a pseudocapacitive material configured and arranged with the graphene sheet to exhibit specific capacitance and energy density that is higher than a specific capacitance and energy capacity of the graphene sheet.

19. The method of claim 17, wherein the single-crystal structure includes $Ni(OH)_2$.

20. The method of claim 17, wherein the first electrode includes a plurality of the graphene sheets with a single-crystal structure grown upon each sheet, the plurality of graphene sheets overlapping one another to form a three-dimensional conducting network that is configured and arranged to transfer electrons between the graphene sheet and the separator.

21. The method of claim 17, wherein the second electrode includes a $RuO_2$ graphene hybrid material including $RuO_2$ grown on a graphene sheet.

22. The method of claim 17, wherein
   the single-crystal structure includes $Ni(OH)_2$, and
   the second electrode includes a $RuO_2$ graphene hybrid material including $RuO_2$ grown on a graphene sheet.

23. The method of claim 17, wherein the first electrode is an anode and includes single-crystal $Mn_3O_4$ configured and arranged to interact with lithium ions for passing charge carriers between the first and second electrodes.

24. The method of claim 17, wherein the first electrode is a cathode and includes $LiMn_{1-x}Fe_xPO_4$ nanorods configured and arranged to facilitate diffusion of lithium charge carriers between the first and second electrodes.

25. The method of claim 1, wherein in one stage of manufacturing, the graphene sheet is in a first form, and then rolled.

* * * * *